May 24, 1949.  A. WEISENBURG  2,471,255
MACHINE FOR APPLYING SPOTS TO BOTTLE CAPS
Filed Feb. 3, 1942  12 Sheets-Sheet 1

Inventor
Andrew Weisenburg
Attorneys

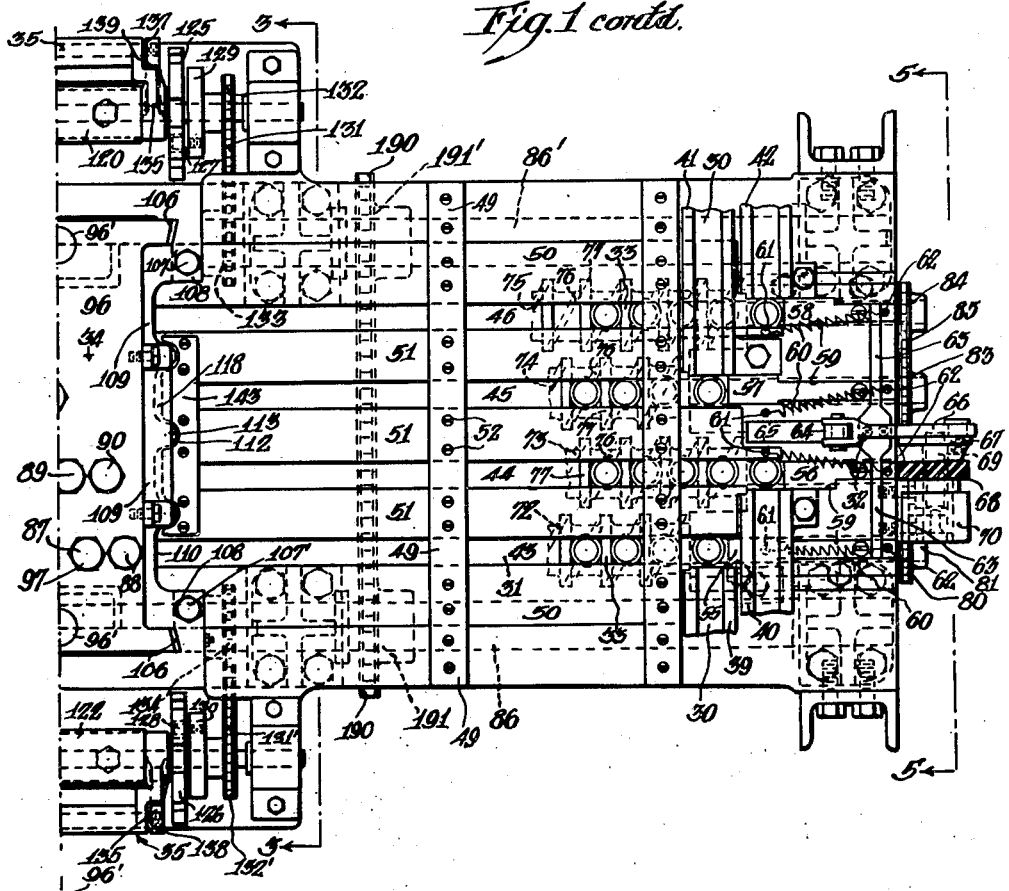
Fig. 1 contd.
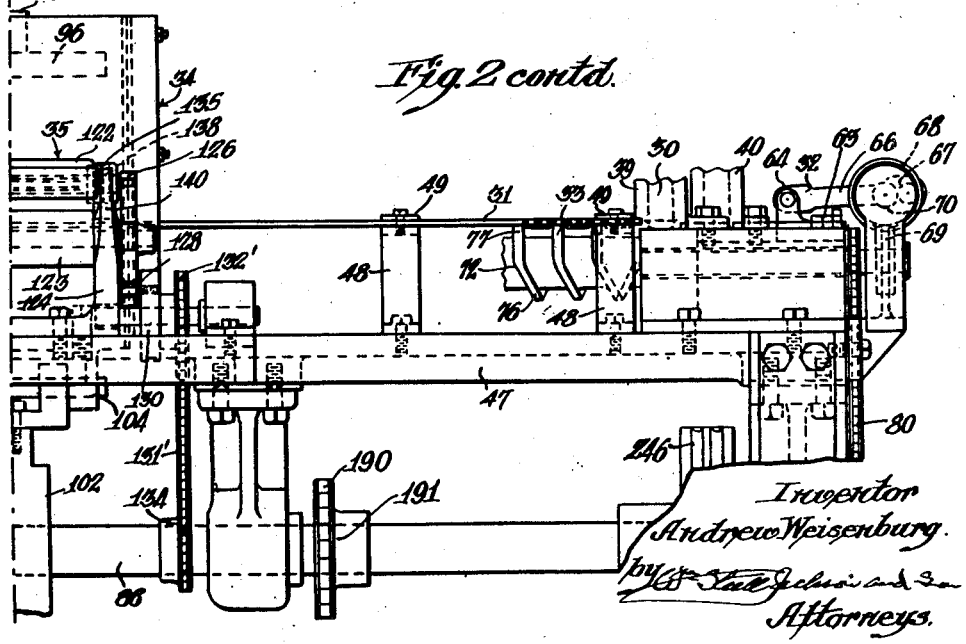
Fig. 2 contd.

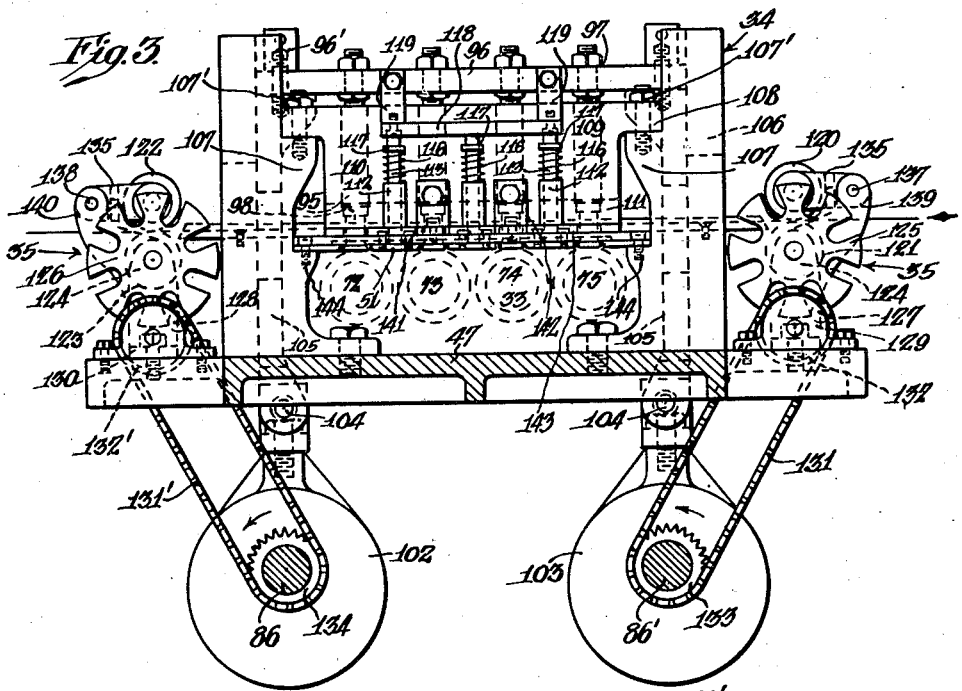
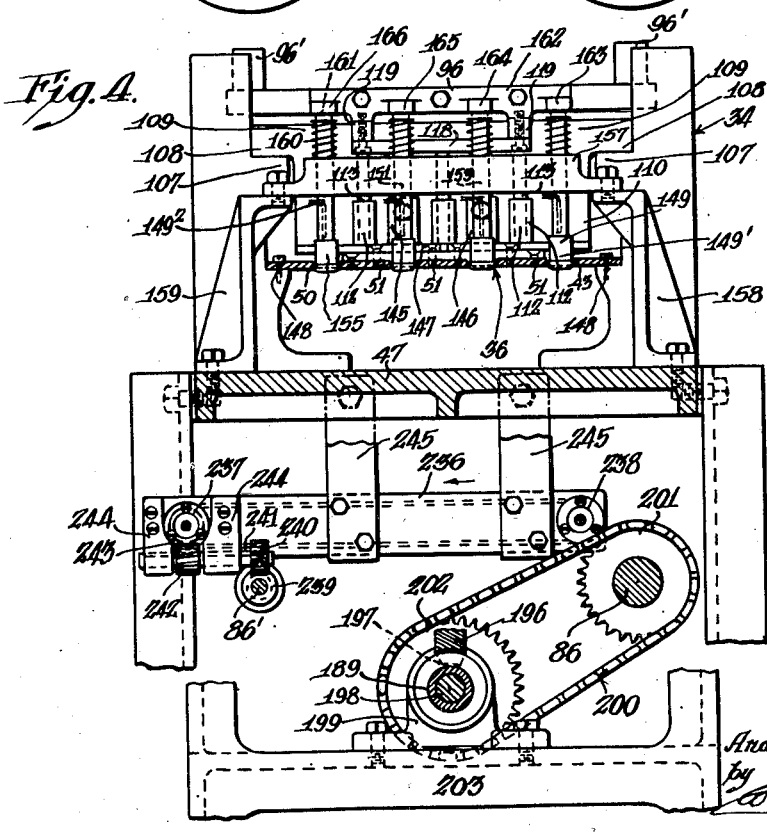

May 24, 1949.  A. WEISENBURG  2,471,255
MACHINE FOR APPLYING SPOTS TO BOTTLE CAPS
Filed Feb. 3, 1942  12 Sheets-Sheet 4
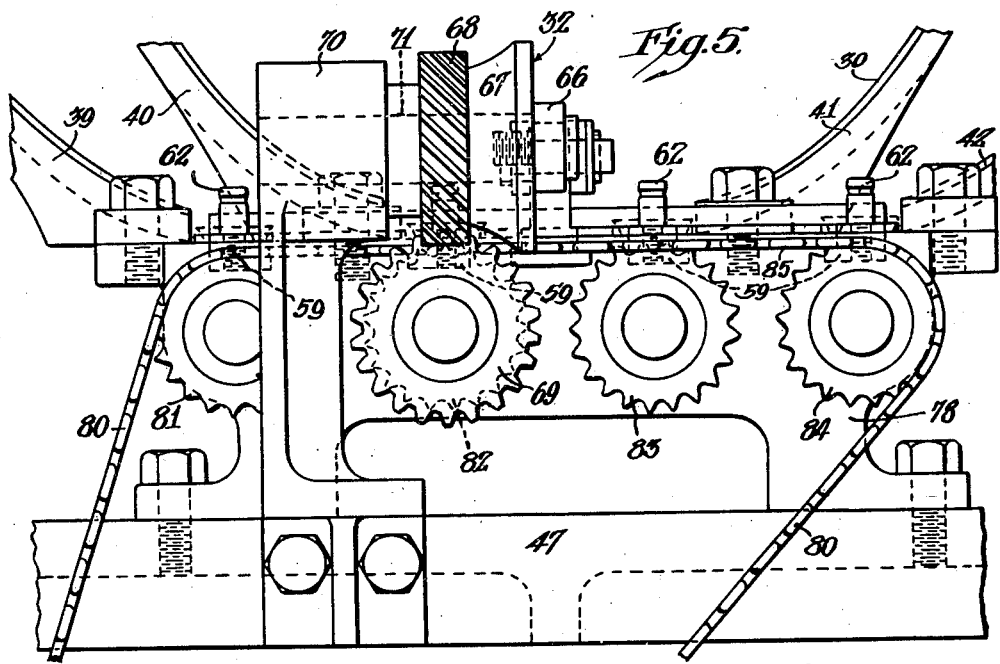
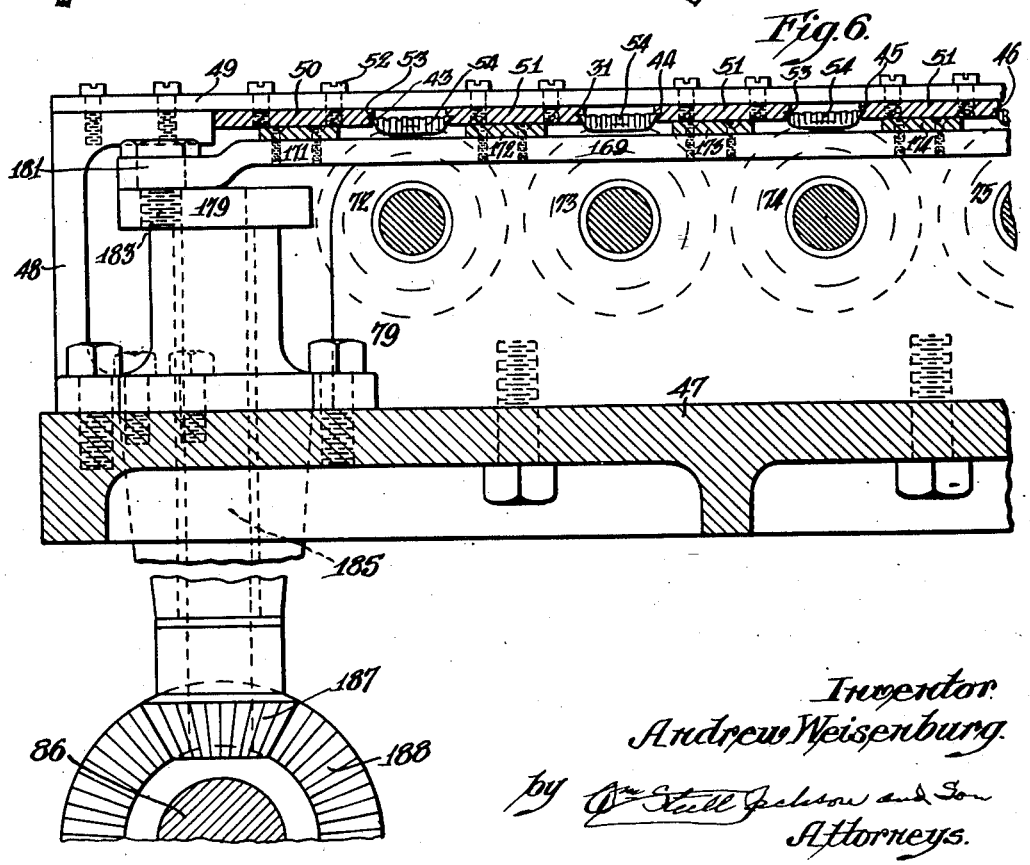
Inventor
Andrew Weisenburg
by
Attorneys

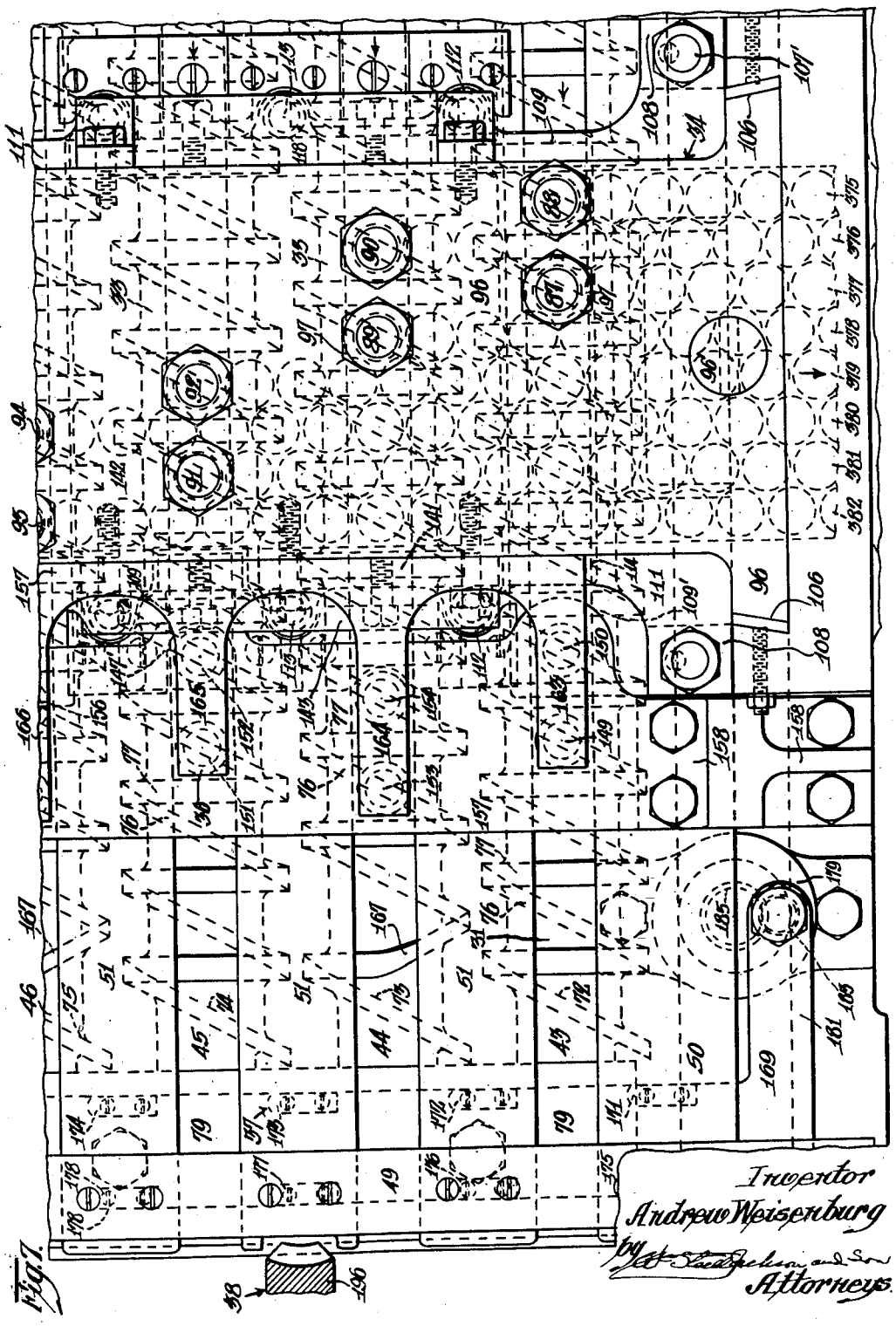

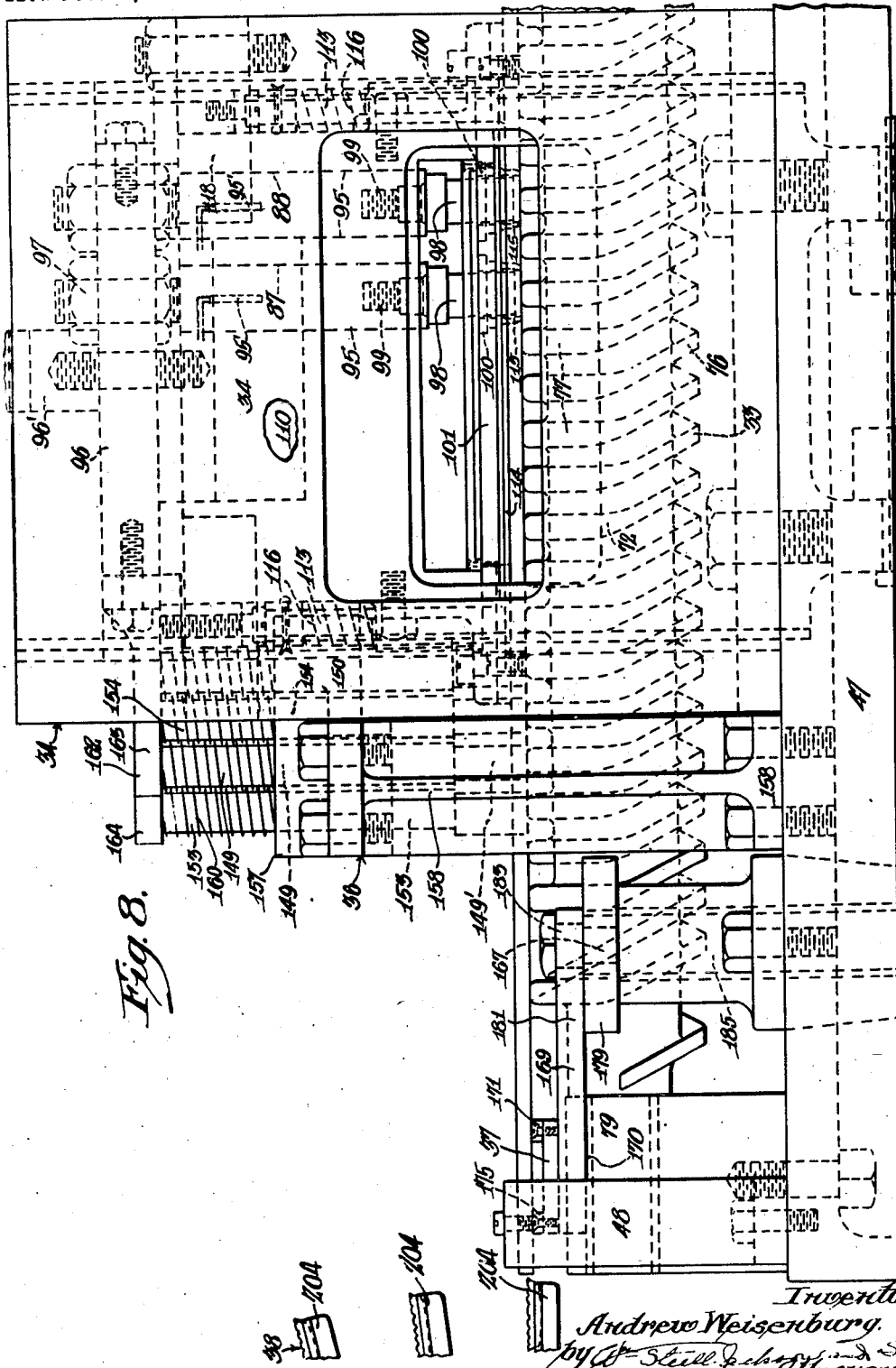

May 24, 1949.  A. WEISENBURG  2,471,255
MACHINE FOR APPLYING SPOTS TO BOTTLE CAPS
Filed Feb. 3, 1942  12 Sheets-Sheet 7
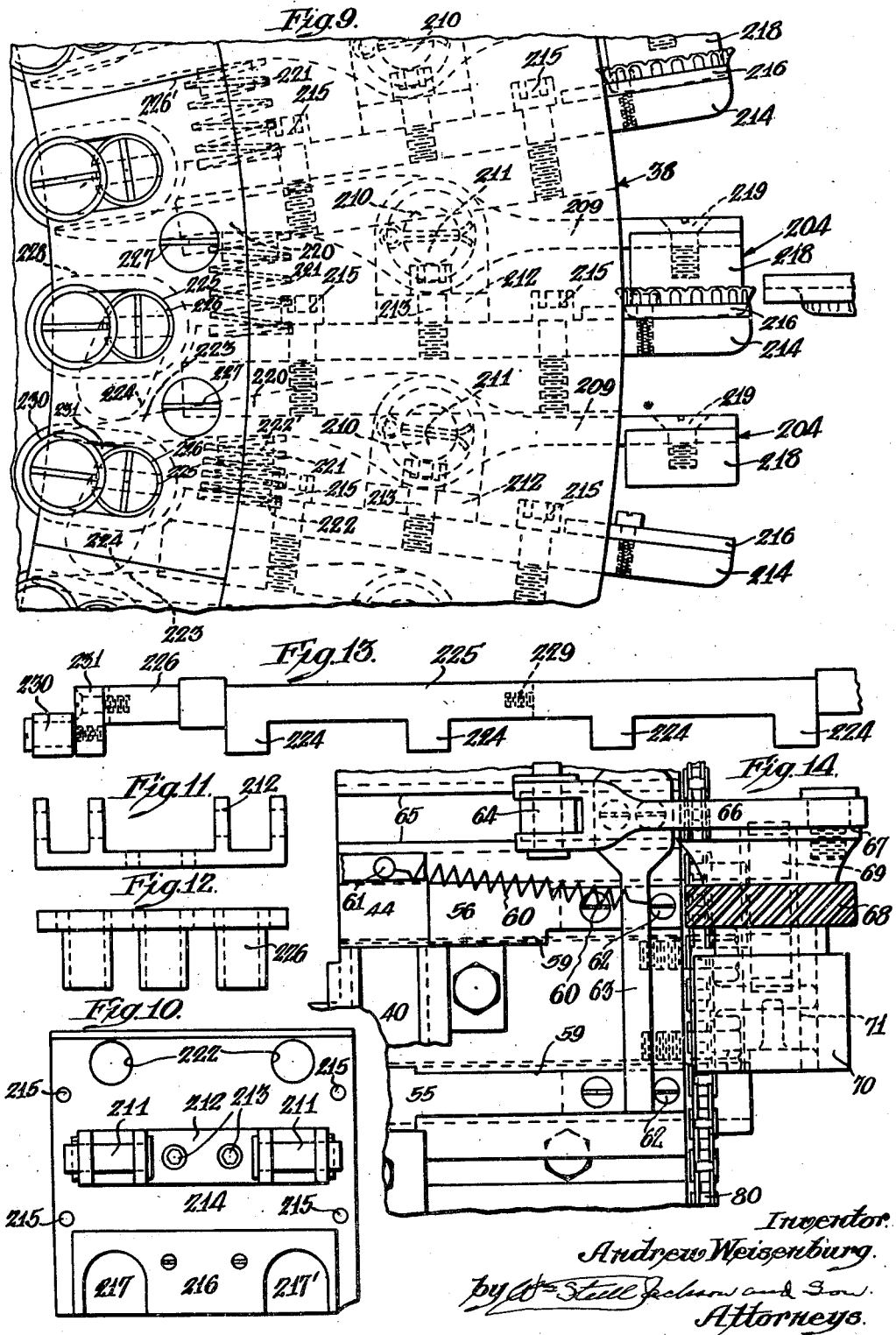

May 24, 1949. A. WEISENBURG 2,471,255
MACHINE FOR APPLYING SPOTS TO BOTTLE CAPS
Filed Feb. 3, 1942 12 Sheets-Sheet 8
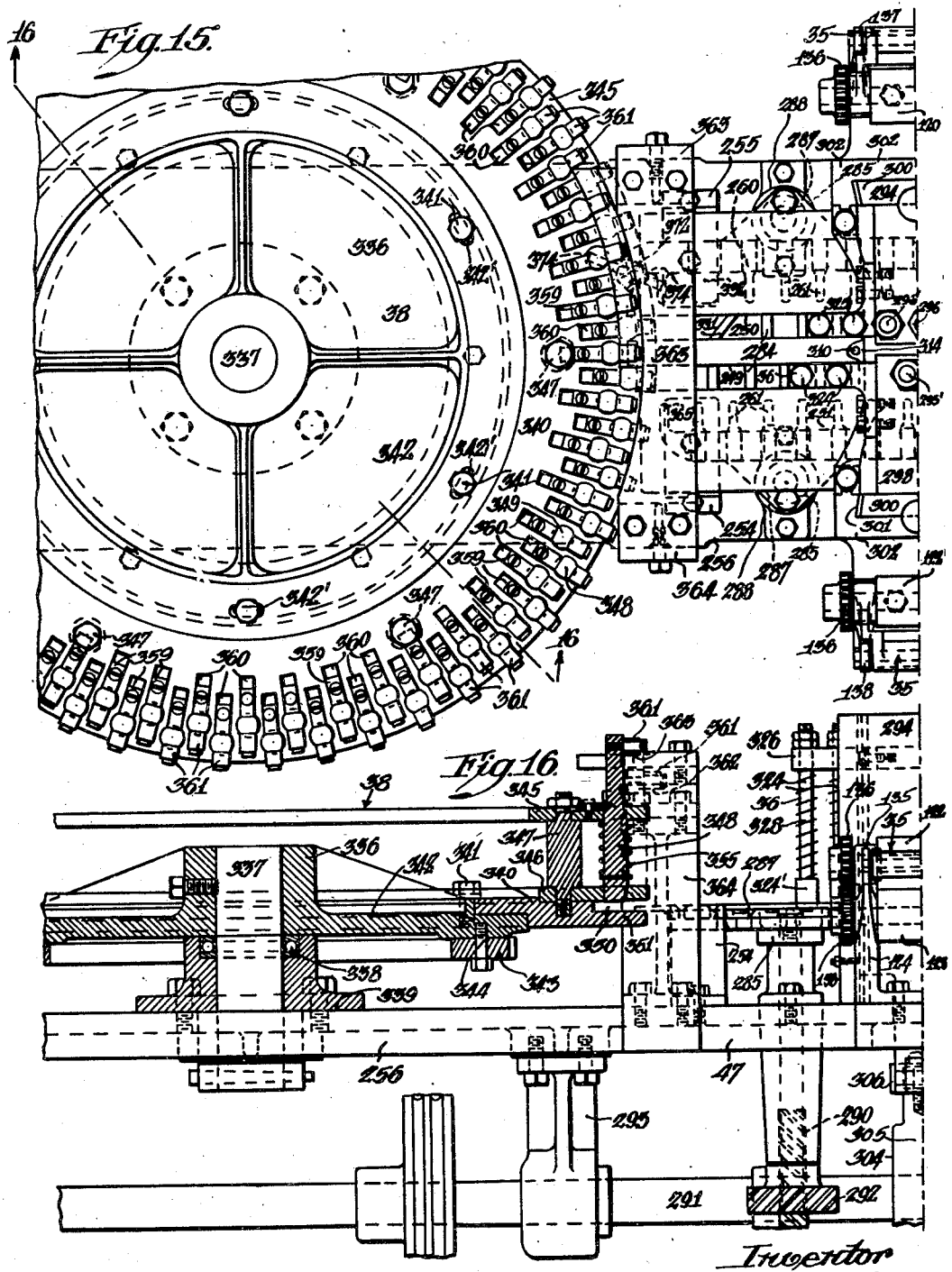
Inventor
Andrew Weisenburg.
by W. Steele Jackson and Son
Attorneys.

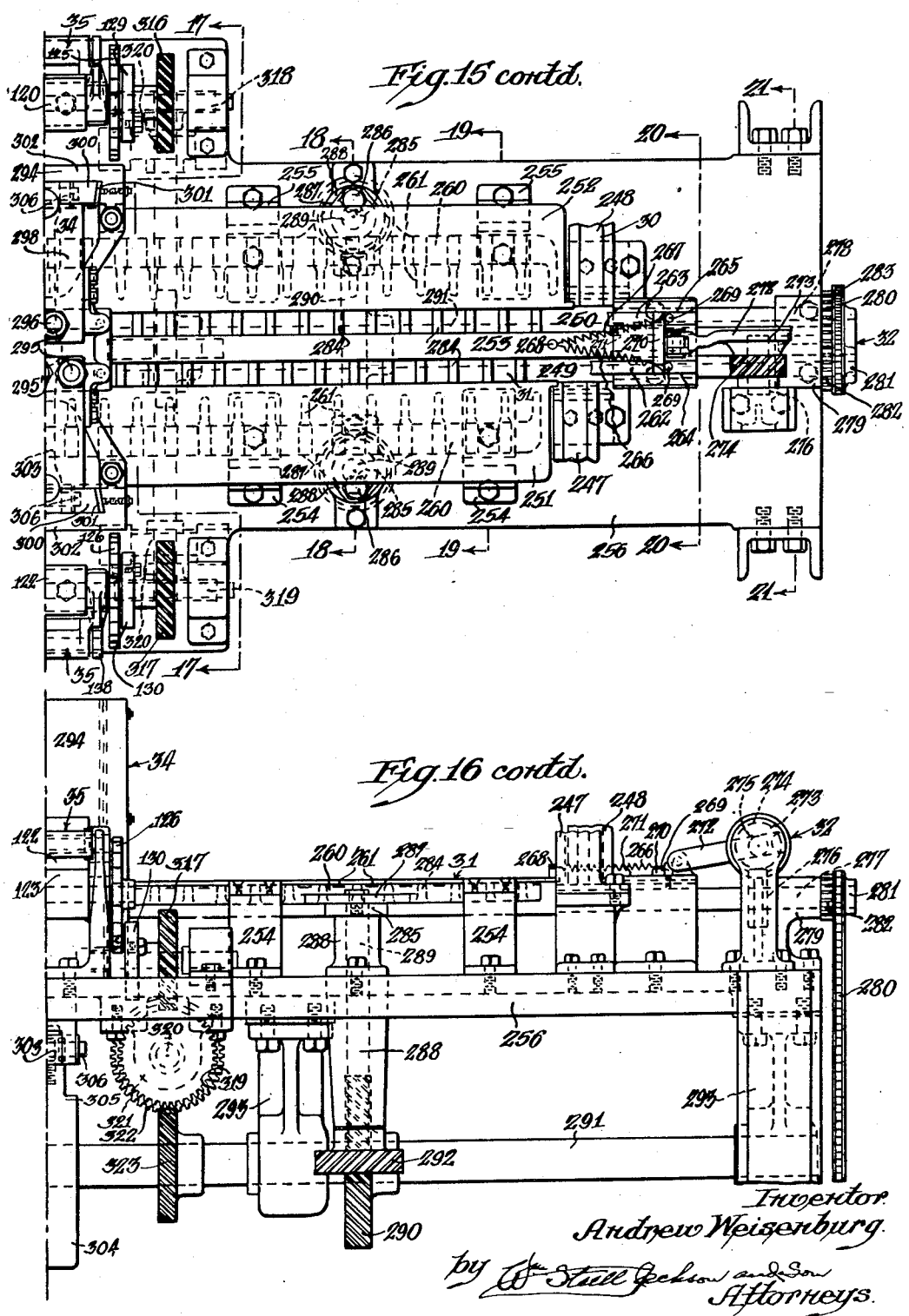

May 24, 1949.　　　A. WEISENBURG　　　2,471,255
MACHINE FOR APPLYING SPOTS TO BOTTLE CAPS
Filed Feb. 3, 1942　　　　　　　　　　　　12 Sheets-Sheet 10
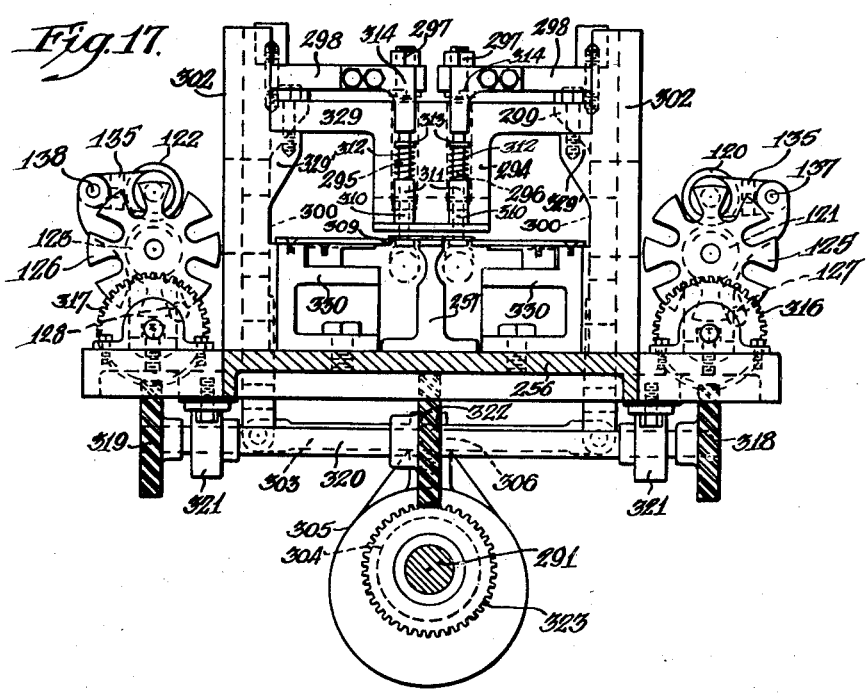
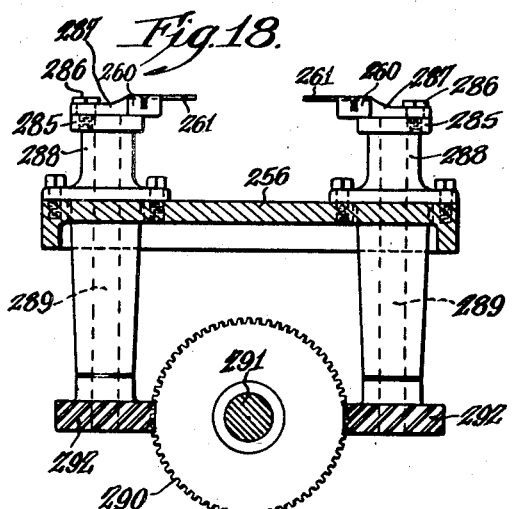
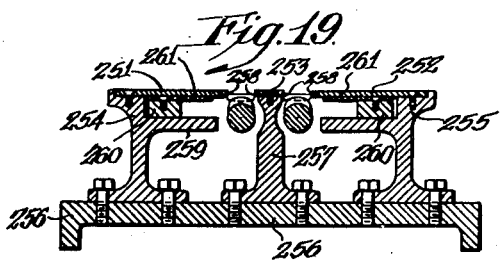
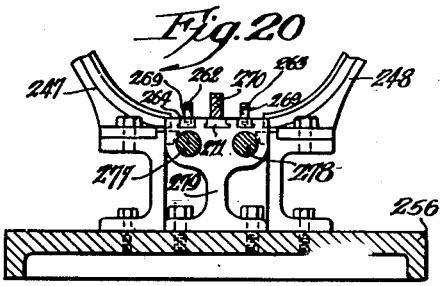
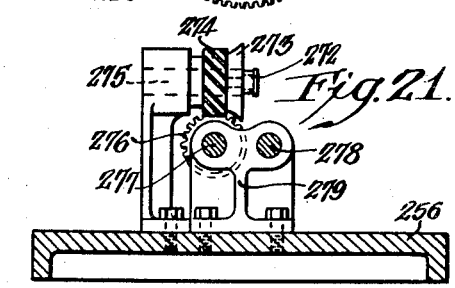
Inventor
Andrew Weisenburg
by
Attorneys May 24, 1949.  A. WEISENBURG  2,471,255
MACHINE FOR APPLYING SPOTS TO BOTTLE CAPS
Filed Feb. 3, 1942  12 Sheets-Sheet 11
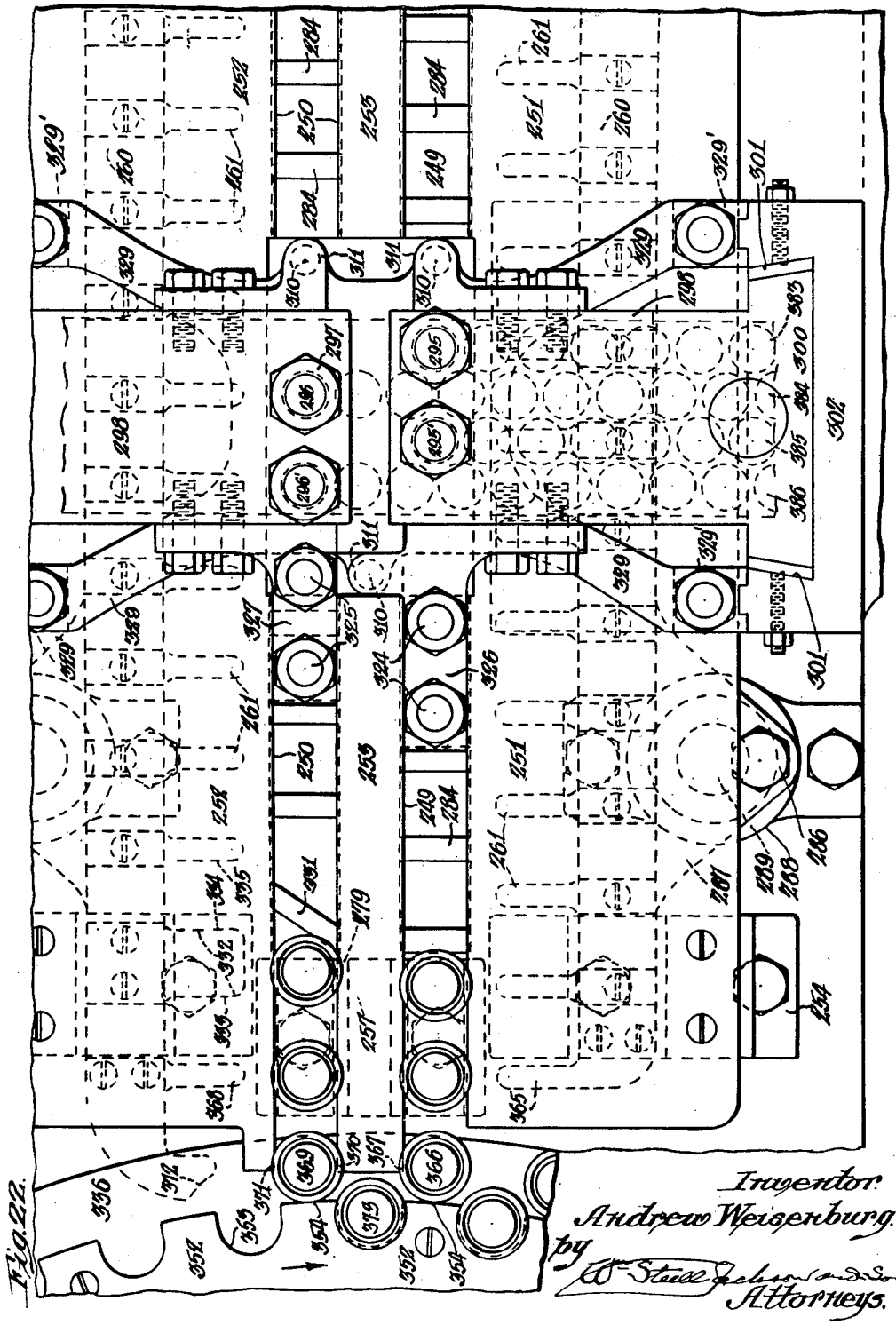

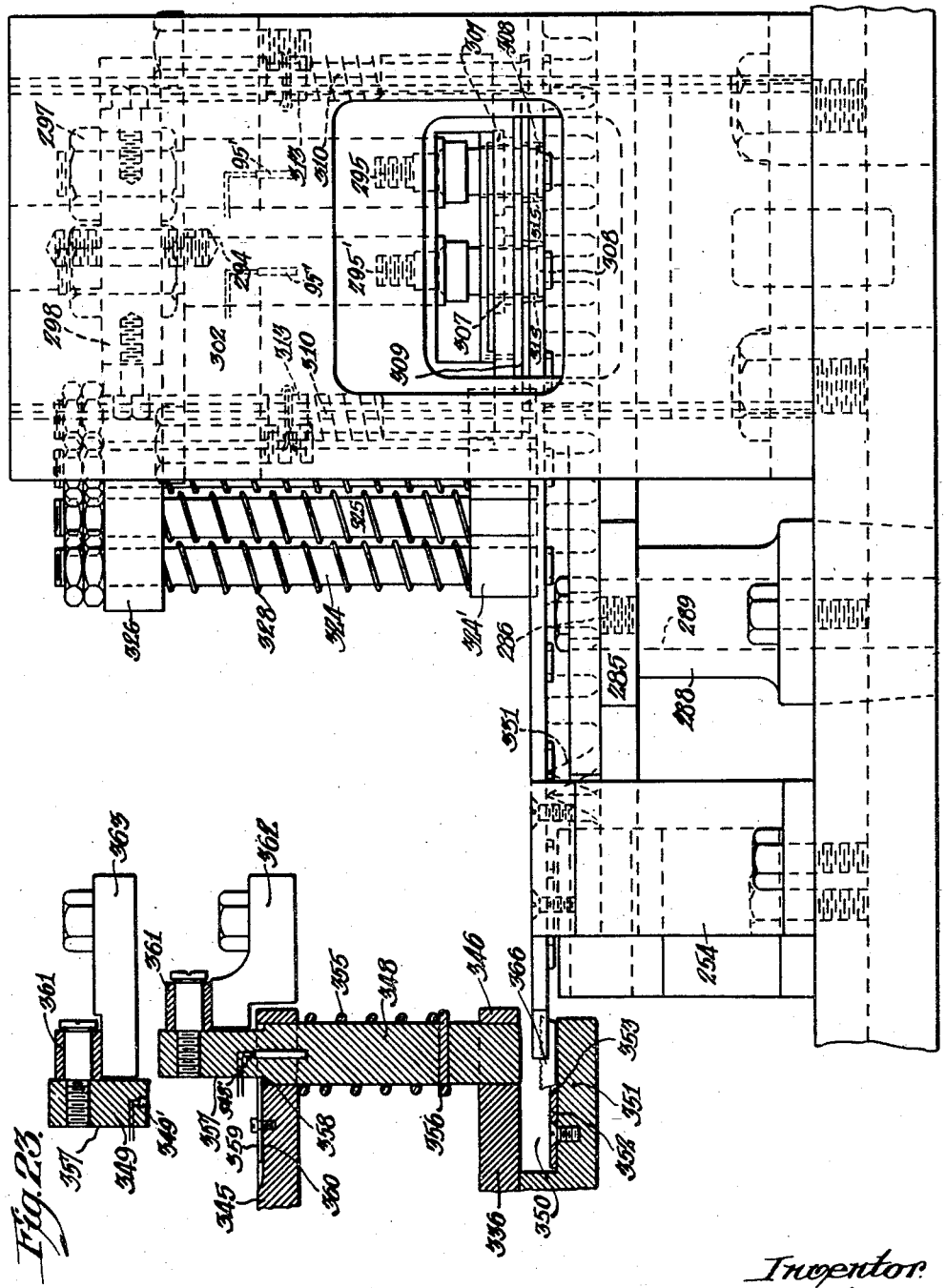

Patented May 24, 1949

2,471,255

UNITED STATES PATENT OFFICE 2,471,255

MACHINE FOR APPLYING SPOTS TO BOTTLE CAPS

Andrew Weisenburg, Overbrook Hills, Pa., assignor to Continental Can Company, Inc., New York, N. Y., a corporation of New York Application February 3, 1942, Serial No. 429,369

46 Claims. (Cl. 154—1.5)

The present invention relates to machines for applying protective spot material to the inner surfaces of caps, particularly crown caps, of the type commonly used on bottles.

The purpose of the invention is to reduce the percentage of waste or scrap produced on a machine for applying protective spot material to caps.

A further purpose is to obtain greater cap production for a given lineal speed of a machine for applying protective spot material to caps.

A further purpose is to progress protective spot material at lower speeds with less danger of tearing the material but without reducing the production in a machine for applying protective spot material to caps.

A further purpose is to reduce the number of machines, the size of machines, and the financial investment in machines required to obtain a given production in the application of protective spot material to caps.

A further purpose, in a machine for applying protective spot material to caps, is to progress the caps in rows by stop and go motion, to progress a strip of protective spot material transversely of the rows, with stop and go motion having corresponding stop periods, and desirably simultaneously to cut out and affix protective spot material to a plurality of adjoining caps in each row.

A further purpose, in a machine for applying protective spot material to caps, is to progress a plurality of parallel rows of caps in rows with stop and go motion, to progress a strip of protective spot material transversely of the rows with stop and go motion having corresponding stop periods, and desirably simultaneously to cut out and affix protective spot material to at least one cap in each of three or more rows, and preferably to a plurality of adjoining caps in each of three or more rows.

A further purpose, in a machine for applying protective spot material to caps, is to progress a plurality of parallel rows of caps with stop and go motion, the cap centers desirably being spaced by approximately a multiple of the desired spot diameter, to progress the strip of protective spot material transversely of the rows and with stop and go motion having corresponding stop periods, and desirably simultaneously to cut out and affix spot material to a plurality of caps in each row or less desirably to at least one cap in each of three or more rows, the distance from the center of each line of cut-out positions to the center of the next adjoining line being approximately equal to the diameter of the cut-out.

A further purpose in a machine for applying protective spot material to crown caps, is to progress a plurality of parallel rows of crowns bottom up with stop and go motion, desirably spacing the crown centers in each row approximately twice the desired spot diameter, to progress a strip of protective spot material transversely over the rows with stop and go motion having corresponding stop periods, and desirably simultaneously to punch out and adhesively affix circular protective spots to a plurality of crowns in each row, each line of punching centers being laterally spaced from the next adjoining line by a distance approximately equal to the punching diameter and each punching being staggered with respect to the next one of an adjoining line.

A further purpose, in a machine for applying cut-out protective spot material to caps, is to progress a plurality of rows of caps with stop and go motion, the cap centers being preferably spaced approximately twice the desired spot diameter, and the distance between row centers being an integer-plus-one-half times the sum of the desired spot diameter and the desired space between successive cut-outs in the same line, to progress a strip of protective spot material transversely of the rows with stop and go motion having corresponding stop periods, and desirably simultaneously to cut out and affix protective spot material of circular form preferably to a plurality of caps in each row and less desirably to at least one cap in each of three or more rows, the center of each line of cut-out positions being laterally displaced with respect to the center of the next adjoining line by approximately the cut-out diameter.

A further purpose, in applying punched-out protective spot material to crown caps, is to progress a plurality of parallel rows of crowns bottom up with stop and go motion, desirably spacing the crown centers in each row approximately twice the desired spot diameter, the distance between row centers being an integer-plus-one-half times the sum of the desired spot diameter and the desired spacing between successive cut-outs in the same line, to progress a strip of protective spot material transversely over the rows with stop and go motion having corresponding stop periods, and desirably simultaneously to punch out and adhesively affix circular protective spots to a plurality of crowns in each row or less desirably to at least one crown in each of three or more rows, each line of punching centers being laterally spaced from the next adjoining line by a distance approximately equal to the spot diameter and each punching being staggered with respect to the next one of an adjoining row.

A further purpose, in a machine for applying punched-out protective spot material to caps, desirably crown caps, is to progress a plurality of parallel rows of crowns bottom up with stop and go motion, desirably spacing the crown centers in each row approximately twice the diameter of the spot, the distance between row centers being an integer-plus-one-half times the sum of the spot diameter and the spacing between successive punch-outs in the same line, to progress a strip of protective spot material transversely of the rows with stop and go motion having corresponding stop periods, and desirably simultaneously to punch out and adhesively affix a plurality of circular protective spots in each row, the protective spot material moving from one stop period to the next while the crowns move through a plurality of stop and go cycles equal to the number of crowns simultaneously attached in a single row, each line of punching centers being laterally spaced by a distance approximately equal to the spot diameter and each punching being staggered with respect to the next one of an adjoining row.

A further purpose is to move the protective spot material at a speed which is a fraction of the speed of the caps approximately equal to the reciprocal of the multiple of the number of spots simultaneously affixed in each row times the number of spot diameters between crown centers in each row, typical fractions being one-fourth, one-sixth, etc.

A further purpose, in a machine for affixing protective spot material to crown caps, is to mount a plurality of punches in line with each of two or more rows of crowns from a single operating plate so that all punches in each row and in all of the rows will operate simultaneously during a stop period of the crowns.

A further purpose is to mount a plurality of punches in each of a plurality of rows from an operating plate and likewise to resiliently position crown locators for each of the punches from the same operating plate.

A further purpose is to engage recently spotted crowns in a track by auxiliary pressure plungers cooperating at stop points in the track beyond the point of spot application, and preferably also to operate such auxiliary pressure plungers by resilient connections to an operating plate for the spot dies.

A further purpose is to progress crowns in a plurality of rows side by side in a crown spotting machine, the crowns in the respective adjoining rows being out of step with one another, and to abnormally advance the crowns in a certain row or rows to bring them into step with those in the adjoining row at an advance point in the progression beyond the point of spotting.

A further purpose is to progress crowns in a plurality of rows by cams having advance portions and dwell portions, the dwell portions of the cams in the respective rows being out of step during part of the cam lengths, and to provide abnormal advance portions on a certain cam or cams to bring the crowns in the rows subject to said cam or cams into step with those in adjoining rows.

A further purpose is to progress a plurality of rows of crowns longitudinally of a spot machine in a plurality of crown tracks by cam actuation and to discharge crowns at the ends of the tracks by an eccentric finger bar producing a longitudinally feeding component.

A further purpose is to receive and grip a spotted crown in a pressure dial at a plurality of stations spaced side by side and spaced circumferentially along a cylindrical pressure dial circumference, picking up the spotted crowns at one station and carrying them throughout the major portions of the machine travel under pressure to other stations at which the crowns are discharged.

A further purpose is to receive a spotted crown in a pressure dial between an anvil and a lever-supported pressure head, maintaining the pressure head open for introduction of the crown by cam action on the opposite end of the lever, and permitting resilient pressure application by the pressure head through release of the cam.

A further purpose is to apply pressure with or without heat to spots affixed in crown caps by a lever urged toward closed position of a pressure head by a spring, and to hold a group of such levers in open position by cams on a cam shaft, which cam shaft is rotated by a cam in contact with the cam shaft at a particular station.

A further purpose is to progress crowns in a crown track by an eccentric finger bar and to hold the crowns during stop periods by dwell portions on a cam below the track.

A further purpose is to receive a spotted crown in a pressure dial having radially inner positions and radially outer positions each equipped with pressure plungers and anvils, and to elevate the plungers into open positions by a cam at certain stations on the pressure dial.

A further purpose is to progress crown caps forward in a pair of adjoining tracks by eccentric finger bars, the crowns being out of step in the adjoining tracks during the bulk of the forward progression, to hold the crowns in stop position by cams having dwells and to advance crowns in one track into step with those in the adjoining track by an advance surface on one of the cams.

A further purpose is to bring a series of crowns in one track which are out of step with an adjoining track into step by an advance face on a crown positioning cam while normally advancing crowns by finger bars, and to advance the crowns beyond the position of the advance face on the cam by an abnormally thick finger bar finger.

A further purpose is to advance crowns in a plurality of adjoining tracks by stop and go motion normally out of step, to feed the crowns from one such track into a radially outer position on a pressure dial by the rearmost finger on a finger bar, to bring the crowns from the adjoining track into phase with those of the first track, and subsequently to bring the crowns from the second track into a radially inner position on the pressure dial by co-operative action of a rearward finger on another finger bar and an abutment.

Further purposes appear in the specifications and in the claims.

In the drawings I have illustrated two only of the possible forms in which my invention may be embodied, the species shown being chosen from the standpoint of satisfactory operation and convenience in illustration of the principles involved.

Figure 3 is a section of Figure 1 on the line 3—3, showing the punch housing and the feed for the spot material.

Figure 4 is a section of Figures 1 and 2 on the line 4—4, showing the auxiliary pressure plungers and omitting the crown propulsion cams.

Figure 5 is a right end elevation of Figure 1 in the position indicated by the line 5—5. This view shows the crown chutes, the drive for the crown pushers and the drive for the crown propulsion cams.

Figure 6 is a section of Figure 1 on the line 6—6, illustrating the eccentric finger bar for progressing the crowns near the ends of the tracks.

Figure 7 is a fragmentary enlarged sectional top plan view showing a portion of Figure 1 extending from the punches to the ends of the tracks. This view also shows the eccentric finger bar.

Figure 8 is a fragmentary side elevation of the structure shown in Figure 7, omitting the feed for the spot material and omitting all but two of the punches.

Figure 9 is a fragmentary side elevation, actual size, showing the pressure dial of Figure 2 at the loading position.

Figure 10 is a top plan detail of a plate forming the anvil in which the crown is received in the pressure dial.

Figure 11 is a side elevation detail of the pivot shown in Figure 10.

Figure 12 is a detail side elevation of a segment of the pressure cam housing of the pressure dial.

Figure 13 is a fragmentary detail side elevation of one of the pressure cams for the pressure dial.

Figure 14 is an enlarged fragmentary plan view showing the pusher mechanism at the extreme right of Figure 1.

Figure 15 is a fragmentary top plan view of a somewhat modified embodiment of the invention. This view extends over Sheets 8 and 9.

Figure 16 is a section of Figure 15 on the line 16—16. This view likewise extends over Sheets 8 and 9.

Figure 17 is a section of Figure 15 on the line 17—17, showing the punch housing and the mechanism for advancing the spot material.

Figure 18 is a section of Figure 15 at any desired position of drive for the finger bars, the actual section being taken on the line 18—18 of Figure 15.

Figure 19 is a section of Figure 15 on the line 19—19, showing one of the points of support for the track.

Figure 20 is a section of Figure 15 on the line 20—20.

Figure 21 is a section of Figure 15 on the line 21—21.

Figure 22 is a fragmentary enlarged top plan view, being an enlargement of Figure 15 extending from the punches to and including the ends of the tracks, but omitting the plungers and cams on the pressure dial.

Figure 23 is a fragmentary sectional side elevation of Figure 22, the section being taken vertically through the loading position of the pressure dial.

In the drawings, like numerals refer to like parts throughout.

Figure 1:
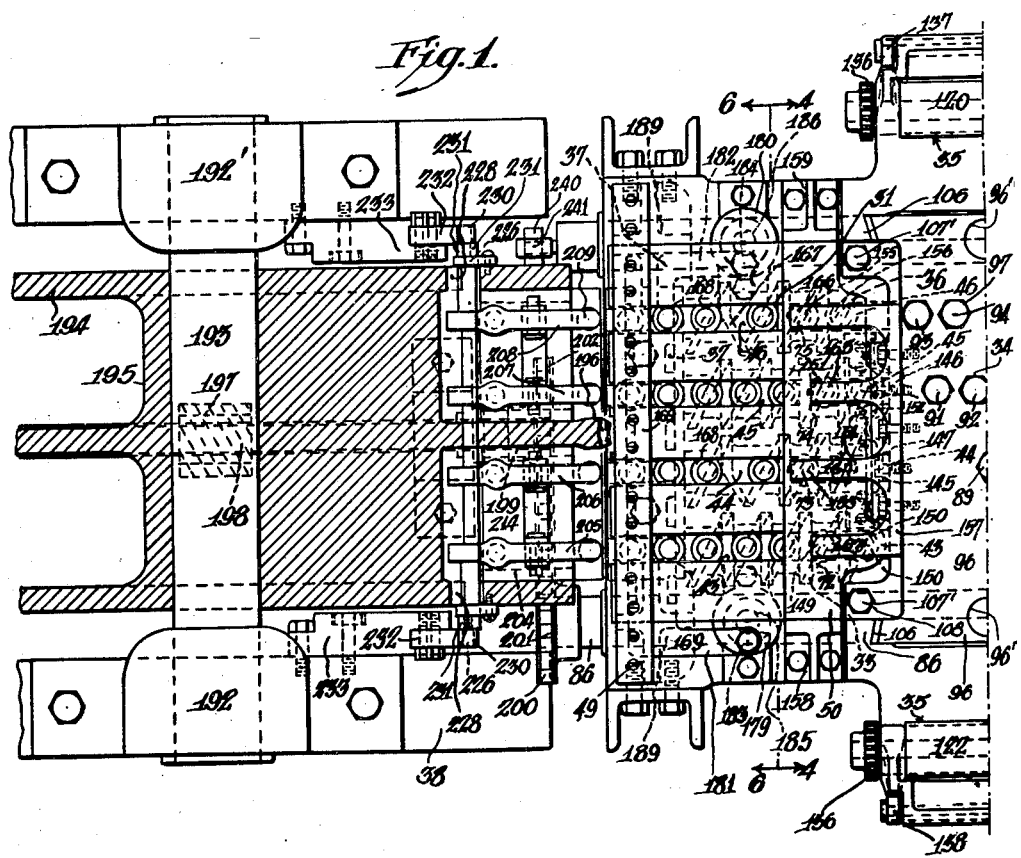
Figure 1 is a fragmentary sectional top plan view of one embodiment of the invention, the section being taken on the line 1—1 of Figure 2. This view extends over Sheets 1 and 2.

It is quite common to place protective spots in the inside of caps such as crown caps for closing bottles. The usual crown cap contains a resilient liner suitably of cork secured to the interior by cement or the like. It is desirable, however, to protect the contents of the container from contact with the resilient liner and for this purpose a spot, usually of circular outline is centrally located on the inner face of the resilient liner.

Any one of a number of protective spot materials may be used. The most common are glassine paper, wax paper, tin foil, aluminum foil, lead foil, and various other papers and foils coated or covered with protective synthetic coatings. Where the invention is being used to apply liners to caps or the like, the sheet material may be paper, cardboard, pulpboard or any other suitable liner material.

The protective spot material is normally applied to the interior of the cap by adhesive. Adhesive may be coated on the inner surface of the resilient liner (cork) or on the surface of the protective spot material which has to contact the resilient liner, or on both surfaces. This will be done preferably by an operation prior to that here described. If the adhesive is of the thermoplastic type, heat may be applied to the surface containing the adhesive prior to the application of the adhesive surface to the surface to which it is to adhere. Likewise, pressure may be applied on the spot material after it is affixed to the resilient liner to assure that firm union is obtained.

The preferable adhesive materials are guttapercha, latex, or an alkyd resin such as glycerol phthalate or glycerol phthalate-maleate, or drying oil modified glycerol phthalate or glycerol phthalate-maleate. These thermoplastic materials will, of course, be heated as desired to render them thermoplastic.

In the present practice of the art, caps are progressed in a single row with stop and go motion, and protective spot material is progressed by a co-operating stop and go motion transversely of the row of caps. As each cap is brought to a stop under the stopped protective spot material a single punch operates to cut out and simultaneously affix a protective spot to the center of the interior of a cap.

There is considerable waste in the protective spot material at the edges and in the triangular portions left between the single line of punch holes.

The problem of elimination of such waste by stopping a plurality of adjoining caps in a given row beneath a row of punches and simultaneously punching out spots and affixing them to all of the caps of the row is complicated by the fact that the spots are substantially smaller than the cap diameters, the caps cannot be more closely placed than the position in which their flanges are touching, and very wide waste strips lie between adjoining spots in such position.

In the usual prevous practice it is necessary to progress the protective spot material at about the same linear speed as that at which the caps move, with resultant danger of tearing the protective spot material and principally of tearing that portion from which the spots have already been cut. The production of the prior art spotting machines is relatively low, as only a single row of caps can be employed.

The present inventor has discovered that, by employing a plurality of rows of caps, by simultaneously cutting out and affixing protective spots to caps in each row, desirably by simultaneously cutting out and affixing protective spots to a plurality of caps in a given row, and by properly arranging the rows and the points of punching with respect to one another, very great savings can be made.

One of the most important savings obtained by the present invention is in the reduction of the amount of waste. Using a double row of caps and three simultaneous punchings per row, a saving of seventeen per cent of the protective spot material can be made. Using four rows of caps and three simultaneous punchings per row, the saving in protective spot material is approximately 18½ per cent. With the arrangements shown in the drawings, substantially similar savings will result.

Since the present invention employs a plurality of rows of caps, for a given linear speed of caps, the production is greatly increased.

Where a plurality of protective spots are punched out and affixed in a given row of caps, the speed of travel of the protective spot material need not be as great as the speed of travel of the caps, but will be a fraction of the speed of travel of the caps approximately equal to the reciprocal of the multiple of the number of protective spots simultaneously punched out and affixed to a particular row of caps times the number of spot diameters between crown centers in each row. Thus, if the number of simultaneous punchings upon the particular row of caps be two, and the crown centers are approximately two spot diameters apart, the speed of the protective spot material will be about one-fourth that of the caps. If the number of simultaneous punchings upon a given row of caps be three, and the crown centers are approximately two spot diameters apart, the speed of progression of the protective spot material will be about one-sixth that of the caps. If the number of simultaneous punchings upon a particular row of caps be four and the crown centers are approximately two spot diameters apart, the speed of the protective spot material will be about one-eighth that of the caps. This reduced speed of the protective spot material tends greatly to reduce tearing, failure to feed and stoppage of the machine.

In each case in the preferred form, while the protective spot material is moving through one stop and go cycle, the caps are moving through two stop and go cycles. When I indicate that the crowns and the protective spot material have corresponding stop periods, I do not mean that the protective spot material is necessarily stopped at every stop period of the crowns, in fact, it will normally be at every other stop period.

A further advantage of the present invention is that the floor space, the number of machines and the investment in machines is definitely less than the equipment of the prior art.

In order to gain the advantages of the present invention, it is necessary to relate the positions of punching of the protective spots to the positions of the rows of crowns and the spacings of the crowns so that the cut-outs of protective spot material will be staggered in one line with respect to the adjoining line and will, therefore, inter-nest. Thus, each successive punching uses a portion of the material which would otherwise be wasted in making the punchings of the adjoining line.

The caps move in parallel rows and the caps in each row are preferably spaced so that the distance between the centers of adjoining caps is approximately a multiple and preferably about twice or four times the diameter of the protective spot. The spacing of the caps will be uniform and will preferably closely approximate that used in the prior art.

When I say that the spacing of the cap centers is approximately a multiple of the spot diameter, I recognize that there is desirably a slight inter-nesting of the cut-outs of adjoining lines. Thus the cut-outs of one line desirably slightly cross the line of tangents of the cut-outs of the adjoining line on the adjoining side. The spacing of the cap centers in any row is then accurately a multiple of the spot diameter minus the distance of internesting of the cut-outs between adjoining lines of cut-outs.

The cap speeds may be as now employed, suitably of the order of five hundred caps per minute in a given row.

The manner of progression of the caps may be any usual or accepted manner which will produce intermittent or stop and go motion, and different forms of progression are shown in the two species illustrated.

In the form of Figures 1 to 14 inclusive, the main portions of the machine consist of the crown chutes 30, the crown tracks 31, the pusher mechanism 32, the crown actuating cams 33, the punch mechanism 34, the spot material feed 35, the auxiliary pressure plungers 36, the auxiliary finger bar 37 and the pressure dial 38.

There are four crown chutes 39, 40, 41 and 42, which extend laterally of the machine (Figure 5) and connect to the tracks 43, 44, 45 or 46, respectively, which extend longitudinally from end to end of the machine (Figure 1) until the pressure dial is reached.

Figure 2:
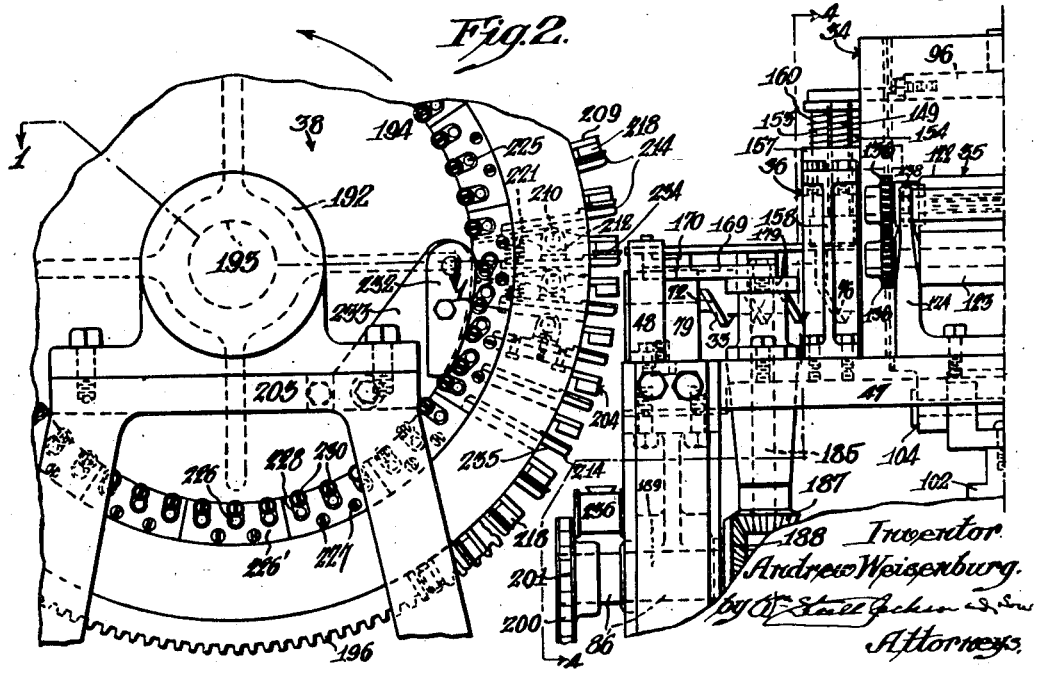
Figure 2 is a fragmentary side elevation of the structure of Figure 1. This view extends over Sheets 1 and 2.

The tracks are supported from the base 47 of the machine by posts 48 disposed at intervals (Figures 2 and 6). The posts support cross bars 49, from which the rails are hung. The outer rails 50 and the inner rails 51 are fastened under the cross bars 49 by suitable means 52, each rail 50 or 51 having a slot 53 (Figure 6) for receiving and guiding a succession of crowns 54, as well known in the art.

The crowns, after they leave the chutes 30, are progressed forward by pushers 55, 56, 57 and 58 (Figures 1 and 14) which reciprocate in slotted guides 59 and are urged forward continually under the action of tension springs 60, each of which is secured at one end to the stationary structure at 61 and secured at the other end to its corresponding pusher at pin 62. Extending across and above all of the pushers in front of pins 62 is a bar 63 (Figures 1 and 14), which reciprocates on a slideable member 64 in guides 65 (Figure 14) under the action of a crank 66 mounted upon an eccentric 67, which is actuated by spiral gears 68 and 69 (Figures 5 and 14). The gear 68 is supported in a bearing bracket 70 and mounted on a shaft 71. The gear 69 is mounted on the end of one of the crown actuating cams, later to be described.

It will be evident that the pushers are spring urged forward and that the bar 63 as it moves forward allows the springs to pull the pushers forward but does not positively push the pushers forward. Any obstruction encountered will therefore permit the pushers to stop, since they are merely urged forward by spring pressure.

It will be evident from Figures 1 and 14 that the chutes 39 and 41 and pushers 55 and 57 acting in tracks 43 and 45 are relatively advanced with respect to the chutes 40 and 42 and the pushers 56 and 58 acting in tracks 44 and 46. For this reason, crowns in tracks 43 and 45 are relatively out of line with those in tracks 44 and 46 even before the crowns in the respective tracks encounter the cams.

The crowns are actuated in the tracks by stop and go motion applied through cams 72, 73, 74 and 75, each of which has, along its normal course, advancing portion 76 and dwell portion 77 at each station. Each portion respectively covers 180° of the cam. The cams are supported by bearings in housing 78 at the charging end (Figure 5) and are supported at the discharge end by bearings in housing 79 (Figures 6 and 7)

which are suitably mounted on the base 47 of the machine. The respective cams are driven and interconnected by a chain 80 passing across a line of sprockets 81, 82, 83 and 84, as indicated at 85, the chain itself being driven from the main shaft 86 of the machine by a sprocket not shown.

In the device as illustrated in the form of Figures 1 to 14, there are two punches in each track. The punch 87 in the track 43 is opposite a point intermediate between punches 89 and 90 in the track 44, and the punch 88 is spaced one stop and go cycle on the crowns forward of punch 87. Likewise the punch 91 in track 45 is opposite a point intermediate between punches 93 and 94 in track 46, and the punch 92 is spaced one stop and go cycle on the crowns forward of punch 91. At the same time the center of punch 92 is one crown diameter minus the distance of internesting on one side of a line of punch-outs, behind punch 89 in track 44.

In the present invention, the punch positions and the track positions are related, as will be later described.

Each of the punches, as shown in Figures 1, 2, 3, 7 and 8, consists of a punch shank 95 adjustably supported at 97 by a punch bar 96 common to all of the punches, and carrying an individual punch head or cutter 98 removably connected to the punch shank at 99. Electric resistance heaters for the punches are diagrammatically indicated at 95', Figure 8. The punch cooperates with a female die 100 supported in a female die holder 101 common to all female dies.

The punches are actuated as a gang through eccentrics 102 and 103 (Figure 3) which connect at 104 to slides 105 in vertical guide members 106, the slides being fastened to the punch bar 96 by nuts 96'. Eccentrics 102 and 103 are on main shaft 86 and auxiliary drive shaft 86'.

Near the upper ends of the guide members 106 there are lugs 107 which engage lugs 108 on punch housing members 109 which extend vertically at 110 and horizontally at 111 across the machine. The lugs 107 and 108 are fastened together by bolts 107'.

The horizontal portion 111 provides positioning and cylindrical guiding means for the eight punches, and also carries at each end bosses 112 which support and guide the tappets 113 which support the crown locator plate 114 at their lower ends. On the crown locator plate 114 at each punch position are carried locating and guiding annular extensions 115 (Figure 8) whose outside diameter at the lower end is slightly less than the diameter of the crown and whose inside fits closely around the outside of the punch head 98. One annular locating and guiding extension 115 is provided for each punch and when the plate 114 moves to its lowermost position, it positions the crowns firmly immediately beneath the spot punching locations.

The tappets 113 are surrounded by compression springs 116 (Figure 3), acting at their lower ends against the bosses 112, so that the tappets are normally urged upwardly. The tappets 113 are united together above the spring stops 117 by a cross bar 118 which is fastened at 119 (Figures 3 and 4) to the punch bar 96. As the locators move into their lowermost position slightly in advance of the punches, the crowns are immobilized when punching occurs. This insures concentric placement of the spots in the crowns.

The spot material moves transversely of the tracks in stop and go motion having stop periods coinciding with those of the crowns. However, as already noted, the protective spot material will not stop every time the crowns stop. The protective spot material will in this form go through one stop and go cycle while the crowns go through two stop and go cycles. In the form shown, a Geneva motion is used to drive inlet feeding rollers 120 and 121 and outlet feeding rollers 122 and 123 in suitable bearings carried by a housing 124 supported on the base plate of the machine.

The lower rolls 121 and 123 are driven by Geneva gears 125 and 126 on the roll shafts. The Geneva slots of the gears mesh in pins 127 and 128 on discs 129 and 130 driven by chains 131 and 131' engaging sprockets 132 and 132' connected to the shafts of discs 129 and 130 respectively. The chains 131 and 131' are driven from sprockets 133 and 134 on the drive shafts 86' and 86. The upper rolls 120 and 122 are pivotally supported on arms 135 and driven by gears 136. The arms 135 are pivoted at 137 and 138 in extensions 139 and 140 of the housing 124. The upper rolls operate under a pressure determined by their own weight or suitably increased by resilient means if required. The rolls 120 and 122 can be raised for threading spot material through the machine.

On the forward end of the punch housing 109, the innermost tracks are supported as shown in Figure 3 by brackets 141 and 142 engaging the vertical portion 110 of the punch housing 109. The brackets 141 and 142 support a cross bar 143 beneath which are fastened the innermost rails 51. The outermost rails 50 are supported from lugs 144 on the guide members 106. At the rearward end of the punch housing, the innermost rails 51 are supported by brackets 145 and 146 from the vertical portion 110 of the housing 109. The brackets 145 and 146 position a cross bar 147 which supports the tracks 51. The outermost rails 50 are supported by lugs 148.

After the spots have been punched out and affixed to the crowns, it is desirable to apply holding pressure and also heat during certain later stages of the progress toward the pressure dial. This additional pressure and heat will only be needed with certain types of adhesive, such as thermoplastic resins and gums.

The auxiliary pressure plungers in the adjoining tracks are necessarily out of line so that they will match with the positions of stop of the crowns during their intermittent progress. Plungers 149 and 150 in tracks 43 are desirably in the same position as plungers 151 and 152 in track 45, while, correspondingly, plungers 153 and 154 of track 44 and plungers 155 and 156 of track 46 will desirably be opposite one another, but out of phase with respect to plungers 149 to 152.

The punch housing 109 is recessed at 109' (Figure 7) to permit placement of auxiliary pressure plungers 150 and 152 closer to the punch housing than would otherwise be possible in tracks 43 and 45. Also as shown in Figure 7, the cross bar 147 is recessed at 147' for a similar purpose.

The respective plungers 149 to 156 (see Figures 2, 4, 7 and 8) carry enlarged heads 149' which are suitably slightly larger than the spots and slightly smaller than the interiors of the crowns.

The plungers 149 to 156 are supported and guided in a cross bar 157 (Figures 1, 2, 4, 7 and 8) which is rigidly fastened to side brackets 158 and 159 (Figures 1, 2, 4, 7 and 8) from the main frame.

The pressure plungers themselves are resiliently urged upward by springs 160 acting between the cross bar 157 and heads 161 on the upper ends of the plungers.

The plungers are depressed by a cross bar 162 having projections 163, 164, 165 and 166. The bar 162 is rigidly mounted on the punch bar, 96.

Thus it will be seen that the reciprocation of the punch bar 96 operates the punches, which are fastened to the punch bar, and also operates the locator plate which is resiliently connected to the punch bar and the auxiliary pressure plungers which are depressed by the cross bar 162 from the punch bar.

In case heat is to be applied by the auxiliary pressure plungers 149 to 156, inclusive, suitable heating means may be employed, as for example, electric resistance heating elements $149^2$ indicated in Figure 4.

It will be evident that during each forward movement of the track cam for crown advancing, the crowns move forward. During the next portion of the cam rotation, usually about 180°, the crowns are held against advance and at least roughly located by the crown dwells. During this portion of the cam movement, when occasion arises for accurate crown positioning, as at the moment when the spot is to be applied, the crown position is more accurately determined by the crown locator. During the period prior to and immediately subsequent to the affixing of the spot, the adjacent tracks are necessarily out of phase or not abreast in order to obtain the desirable economy in punching of the spot material.

Subsequent to the affixing of the spot and desirably subsequent to the application of heat and pressure to the spot by the auxiliary pressure plungers, it is necessary to advance the crowns in certain tracks abnormally in order to place all crowns abreast prior to transfer to the pressure dial. This assists in simplification of the pressure dial structure and avoidance of abnormal pressure dial alignment at certain points.

As seen in Figures 1, 2, 7 and 8, the cams 73 and 75 at positions 167 are provided with advancing faces on the dwell side, so that the crowns are advanced not only during the portion of the cam circumference during which advancing has normally taken place, but also during about one-half of the remaining cam circumference. Thus it is seen that the crowns at 168 (Figure 1) have advanced a step and a half from the previous dwell position.

The final stage of advance of the crowns in the tracks beyond the ends of the cams 72 to 75 is accomplished by an eccentric finger bar 169 (Figures 1, 2, 7 and 8), which, by its oscillating motion, carries the crowns over the end bearings at 79. The top of the bearing housing 79 supports and guides the finger bar 169 at 170 on its flat upper surface. Fingers 171 to 178 (Figures 6, 7 and 8), two operating in each of the tracks, progress the crowns as the finger bar 169 oscillates under the action of the eccentrics 179 and 180, connecting to the extensions 181 and 182 on the finger bar 169 by eccentric pins 183 and 184.

The eccentrics 179 and 180 are supported on vertical shafts 185 and 186 (Figures 1, 6 and 8) which are driven from the drive shafts 86 and 86' by beveled gears 187 and 188. At the back end of the track, the drive shafts 86 and 86' are supported by bearings 189 (Figures 1 and 2).

It will be noted that the ends of the cam shafts are reduced in diameter adjacent their rearward end bearings as shown in Figure 6.

For the purpose of maintaining adequate interconnections between the shafts 86 and 86', a chain interconnection is shown at 190 (Figure 1) operating on sprockets 191 and 191'.

From the track the spotted crowns must be carried to a pressure dial for continuous pressure application, with heat if necessary, where the adhesive is allowed to set.

The pressure dial 38 is supported from main bearings 192 and 192' on a suitable base 203 which may separate from, but will preferably be rigid with the base 47. A shaft 193 extends across the pressure dial from end to end and supports a cast or otherwise fabricated rotor 194, desirably cored at 195 and carrying a suitably integral worm wheel 196, which engages worm 197 (Figure 4) on shaft 198 in bearings 199 secured to base 203. The shaft 198 is driven from main shaft 86 by a chain 200 operating on sprockets 201 and 202.

The pressure dial is provided with a large number of radial clamping stations 204, each of which is provided with four clamps, 205, 206, 207 and 208, corresponding to the respective tracks from which the crowns are received. The pressure lever 209 in each clamp is pivoted at 210 on a pin 211 supported in one of a pair of standards 212, fastened at 213 to one of the anvils 214. The anvils are suitably fastened to the rotor at 215. On the operating end of each anvil is provided a crown locator 216 having recesses 217 and 217' into which a crown will fit. The pressure is applied by pressure heads 218 which are secured at 219 to the pressure levers.

At the desired point of pressure application, pressure is applied to the reverse ends 220 of the pressure levers 209. The pressure levers are continually urged toward closure of the pressure heads 218 under action of compression springs 221 (Figure 9) which operate between recesses 222 of the anvils (Figure 10) and bosses 222' of the pressure levers. When it is desired in dial operation to maintain the pressure heads in open position, the opposite ends 223 of the levers 209 are depressed by cams 224 (Figures 9 and 13) on cam shafts 225 which have bearings at 226 fastened to the ends of the dial housing. Each bearing unit 226' carries three bearings 226 as shown in Figures 2 and 9. The attachment to the side frame of the rotor is indicated at 227 in Figures 2 and 9.

In order to insert and remove the cams, the sides of the pressure dial rotor have suitably oval recesses at 228 (Figures 2 and 9). Also for convenience in assembling and disassembling the cam shaft, each cam shaft is made in two parts desirably threaded together at 229 (Figure 13).

The cam shafts are actuated by cam rollers 230 on crank arms 231. On opposite sides of the machine, stationary track cams 232 are positioned (Figures 1 and 2), suitably at the discharge station and in advance of the loading station, as shown in Figure 2. The cams 232 are supported by brackets 233 mounted on the base 203. It will be understood that the exact design of the cam 232 and its exact location will to some extent be controlled by the character of the adhesive and the necessity or the lack of necessity for quick application of pressure.

It will be evident that the forward motion of the crowns under the action of the finger bar 169 causes the crowns to travel beyond the track and into the recesses 217 and 217' of the crown locator 216. At the loading station 234 four crowns (one from each track) will be located simultaneously in this position. The pressure dial moves upward continuously at the station 234 and by the time that the crowns at 234 have moved upward, the cam rollers of the corresponding cam shaft are released from the cams 232, and the springs 221 cause the pressure heads 218 to close and apply resilient pressure continuously to the spots and the crowns against the anvils 214. This condition is maintained throughout the remainder of the circumference of the pressure dial until the crowns reach the discharge position 235 (Figure 2), at which point the cam rollers 230 again encounter the cams 232 and the pressure heads 218 open. The crowns then drop under the action of gravity aided if desired by a blast of air, to a discharge conveyor 236 (Figures 2 and 4), supported by tension rollers 237 and 238 and driven by shaft 86' (now reduced in diameter) through spiral gears 239 and 240, through shaft 241 and worm 242 connecting to worm wheel 243. The shaft 241 is supported by suitable bearings 244. The conveyor is supported by brackets 245 from the base of the machine.

From the discharge end of the conveyor 236, crowns may be carried to inspection belts, loading mechanism and the like as desired.

Any suitable main drive may be provided for the shaft 86, a pulley at 246 being indicated in Figure 2.

In operation, it will be noted that crowns may enter from any suitable hopper (not shown) by crown chutes 30, and are engaged by the pusher mechanism 32 which progresses them longitudinally in the tracks until they are picked up and carried forward by the advance portions of the cams 33.

The location of the chutes is such that, as soon as the crowns are engaged by the pushers, the crowns in adjoining tracks are one-half crown center distance out of phase. This is necessary in order that the crown positions may properly cooperate with the special punch positions as required by the present invention.

It should be noted that the crown track centers are spaced with respect to one another in adjoining tracks by a distance which is approximately a multiple of the spot diameter plus a half. In this case, the spacing is three and a half times the spot diameter plus the clearance between the punch outs.

From the point at which the crowns meet the advancing cams, they are progressed forward with or without heat application as may be required by the particular adhesive which will be suitably applied to the reverse face of the spot material prior to use in the machine. Of course it will be evident that, if desired, adhesive may be applied to the top of the lining of the crown, additional to or instead of the adhesive on the spot.

When the crowns have reached a position immediately below the punches in their particular tracks, during the dwell portion of the cam rotation, the crowns will first be contacted by the projections 115 of the crown locator, which will correct any misalignment of the crowns with respect to the punches.

Immediately after or simultaneously with the action of the crown locator, the punches cut through the spot material which has been progressed by intermittent motion, as described, to a position beneath the respective punch. Each punch not only cuts off the spot material but continues in its stroke until the lower surface of the spot contacts the lining of the crown and the spot is affixed in central position to the crown. The crown thus retains its spot when the punch moves upward. The crown is progressed forward by the next advance face of the cam to the next succeeding position and continues step by step until it encounters one of the auxiliary pressure plungers 36 which applies pressure to the spot, suitably also heating the spot during the period of one or preferably two cam dwells.

When the crowns have advanced beyond the auxiliary pressure plungers, they are put in relative alignment in the various tracks by the special cam portions 167 and are then carried forward by the fingers of the eccentric finger bar into the pressure dial 38. As soon as the crowns reach the pressure dial, they are subjected to pressure application by pressure heads 218 and are held for a predetermined period until the adhesive has set. The crowns are then discharged by the conveyor 236. During the movement in the pressure dial the crowns may be heated if desired.

In the form of the invention shown by Figures 15 to 23, I have provided for two rows of crowns instead of four as in the other device.

Many of the features are common to the two machines and others are slightly modified to meet the special requirements of the smaller number of tracks.

Crowns enter the machine through chutes 247 and 248 which feed to tracks 249 and 250 which are formed from outer rails 251 and 252 and a center rail 253. The outer rails are rigidly supported from brackets 254 and 255 on the main frame 256 and the center rail is supported likewise on the main frame by brackets 257. Recesses for supporting the crowns are provided in the rails at 258 (Figure 19). Each bracket 254 or 255 carries a flange 259 which provides a horizontal guide for a finger bar 260 extending longitudinally of the machine and carrying fingers 261 for engaging and progressing the crowns.

As in the other device, already described, the crowns leaving the chutes 247 and 248 encounter pushers 262 and 263 in guides 264 and 265 resiliently urged into their forward position by tension springs 266 and 267, operating between a stationary support 268 and pins 269 on the pushers. In front of the pins 269, a T-shaped cross bar 270 extends between and across the pushers and is guided for reciprocating motion by guides 271 (Figure 20). The cross bar 270 is actuated by a crank arm 272 connected to an eccentric 273 mounted on a spiral gear 274 on a shaft 275 and meshing with a spiral gear 276 on the cam shaft 277. Shaft 277 and cooperating shaft 278 are supported in suitable bearing brackets 279 and extend for the full length of the machine. The drive to the shafts 277 and 278 is through chain 280 and sprocket 281 on shaft 277 interconnecting to shaft 278 by gears 282 and 283 (Figure 15).

The shafts 277 and 278 carry locator cams or dwells 284 which are out of phase in the respective tracks as shown on Figure 15. The cams 284 perform purely the locator function, since the function of progressing the crowns forward is performed in this machine by the fingers 261 and not by cam advancing portions.

It will be evident that in either machine, the progression might be accomplished by the fingers or by the advancing cams, with slight modification to accommodate the different space requirements.

The finger bars 260 move in an eccentric path under the action of eccentrics 285 which connect by eccentric pins 286 to finger bar extensions 287. The eccentrics 285 are supported by bearings 288 on shafts 289 driven by spiral gears 290 on main shaft 291 through spiral gears 292 on the lower ends of shafts 289 (Figure 18). The main shaft 291 runs substantially the length of the machine and is supported by bearing brackets 293.

The punch housing 294 is substantially identical with the punch housing described for the other species. The punches 295 and 295' in track 249, and 296 and 296' in track 250 are adjustably secured at 297 to plates 298, which are supported by bosses 299 on vertically slideable members 300 operating in guides 301 of uprights 302. Bar 303 cross connects the slideable members 300 near the bottom. The entire assembly, including the bar 303 and the slideable members 300 as well as the plates 298 is reciprocated up and down by eccentric 304 within eccentric strap 305, which is connected to bar 303 by pivot pin 306 (Figure 17).

The female die 307 and punch heads 308 are desirably identical with those already described.

The locator plate 309 is supported in locator plungers 310 on opposite sides of the machine, guided by bosses 311 and spring urged upward by springs 312 acting between bosses 311 and collars 313 on the plungers 310. The upper parts of the plungers 310 are held by brackets 314 which are secured to plates 298.

On the lower portion of the locator plate, the locator extensions 315 are shown in Figure 23 in lowermost position surrounding the punch head at the point of spot application.

The feed for the spot material in this form is identical with that already described except for slightly different actuation of the discs 129 and 130 which carry the Geneva pins 127 and 128. On the same shafts as discs 129 and 130 are spiral gears 316 and 317 which respectively interconnect with spiral gears 318 and 319 on a cross shaft 320 (Figure 17) in bearings 321 supported from the main frame. The shaft 320 is interconnected with the main drive shaft 291 by spiral gears 322 and 323.

At the rear end of the punch housing, suitable auxiliary heating and pressure plungers are provided, as shown in Figures 15, 16, 22 and 23. The auxiliary plungers 324 and 325 are supported and cylindrically guided by bracket extensions 326 and 327 from the plate 298.

Springs 328 acting between extensions 326 or 327 and heads 324' resiliently urge the plungers downward and they are carried up and down with the reciprocation of plates 298.

The punch housing 294 has extensions 329 which are secured to bosses 329' from the uprights 302.

In front of the auxiliary pressure plungers within the punch housing, the finger bars are supported by special brackets 330 (Figure 17) extending upward from the main frame and also supporting the outer rails.

Beyond the punch housing and the auxiliary plungers, the crowns in row 250 receive an abnormal advance from the cam portion 331, which advances a crown until it is abreast of the corresponding crown in row 249. This advance takes place while other crowns are in a period of dwell. Also at the point opposite the cam face 331, a special finger 332 is provided to sweep the crown forward the normal distance. The finger 332 has a forward face 333 which corresponds with the forward face of the corresponding finger in the track 249 and has a rearward face 334 which cooperates with the forward face 335 of the preceding finger to hold the crown prior to its advance by the cam face 331.

In the present species, the pressure dial is on a vertical axis.

The pressure dial consists of a rotor 336 on a central shaft 337 having bearings 338 (Figure 16) and supported from the main frame at 339. The circumference of the rotor is preferably constructed of a separate annular member 340 secured at 341 to the hub portion 342 of the rotor. At the points of attachment 341 there are slots 342' (Figure 15) to permit circumferential adjustment of the radially outer portion 340 with respect to the hub 342. The rotor 336 is continuously driven by a ring gear 343 (Figure 16) secured at 344 to the bottom of the hub portion 342. The gear 343 is driven by any suitable means, not shown.

Near the outer circumference of the rotor I provide upper and lower annular plates 345 and 346 positioned and spaced by studs 347. Openings in the annular plates 345 and 346 position and guide plungers 348 in the outer row and plungers 349 in the inner row. Electric resistance heaters for the plungers are conventionally indicated at 348' and 349', Figure 23.

Below the ends of the plungers is provided a recess 350 whose bottom portion 351 serves as the anvil against which the crowns are pressed. Locator plates 352 (Figure 22) provide recesses 353 to locate the crowns on the anvils beneath the inner row of plungers 349 and provide abutments 354 for locating the inner edges of the outer row of crowns beneath the plungers 348.

Surrounding each plunger is a compression spring 355 which operates between the lower edge of the plate 345 and the pin 356.

On the inner ends of the plungers 348 and 349 I machine flats 357 which leave shoulders 358 (Figure 23). Engaging the flats I provide strips 359 in recesses 360 which prevent the plungers from turning. Carried on the upper ends of the plungers are cam rollers 361 which are normally out of engagement, permitting the plungers 348 and 349 to move to lowermost position under the action of the springs 355, and thus clamping the spots against the linings of the crowns.

At times of loading and discharge, the cam rollers 361 encounter cams 362 and 363 in the respective inner and outer rows of plungers and are pulled against the action of the springs into uppermost positions.

The cams are adjustably supported in a cam housing 364 which extends from one side to the other of the tracks.

When the finger bar in each of the tracks moves forward, the last finger 365 operating in track 249 carries a crown onto the outer ledge of the anvil as shown at 366. The end 367 of the central rail and the abutment 354 on the locator plate locate the crown and it is immediately engaged by a plunger in the outer row, which is released by its cam at that moment.

From the track 250 a crown is swept forward by the finger 368 to the position 369 exactly opposite position 366, and here it is held by the edges 370 and 371 of the rails. As the pressure dial moves continuously in the direction of the arrow, a recess 353 in the inner row reaches a position opposite the crown 369 and at the same moment a special end finger 372 on the finger bar 260 which operates in the track 250 carries the crown 369 forward into the recess 353. A crown which has just been placed in this manner is shown at 373.

The partially overlapping arrangement of the crowns in the pressure dial is very desirable because of the requirements regarding the lateral spacing of the tracks in order to obtain proper punch location.

The crown may be unloaded by any suitable means, for example by the ejector finger 374 (Figure 15) which extends into the space 350 just above the level of the locator plate and in diagonal position and forces the crown out of the pressure dial into a suitable conveyor or receptacle.

In operation of the device of Figures 15 to 23, crowns suitably aligned enter the machine through the crown chutes, which carry them to the tracks 249 and 250. The pushers 262 and 263 there engage the crowns and push them forward until they are in position to encounter the fingers on the finger bars and the dwells on the cams. As the chutes are located out of phase on the respective tracks and the pushers are positioned out of phase, the crowns in one track are opposite intermediate positions between crowns in the next track.

Once the crowns are engaged by the fingers of the finger bars, they are pushed forward in step by step motion, the cams moving upward and engaging the crowns at such time as the finger bars are in inoperative position.

The crowns are encountered by the crown locating extensions on the locator plate, and are positioned and held by these extensions at the time that the punches (two in each track) operate.

After the spots have been duly applied to the interiors of the crowns, the crowns are engaged by the auxiliary pressure plungers 324 and 325 at two positions in each track. The crowns in track 250 are next abnormally advanced by cam 331 until they are abreast of those in track 249. Subsequent action of fingers on the finger bar moves the crowns in track 249 into position beneath the outer line of plungers on the pressure dial, and substantially simultaneously the cam 362 permits the corresponding plunger to move down upon the crown. The crowns in track 350 move in two steps, first into an outer position of the pressure dial, and then, under the action of the special finger 372, into the crown locator recess 353. The cam 363 then permits pressure application to this crown. In the pressure dial the crowns are held under pressure and permissibly also under heat (as by heating the plungers 348 and 349 by heaters 348' and 349' on the machine) for a predetermined period and then discharged from the device in finished form.

In both forms of the invention, the caps in adjoining tracks are desirably in echelon or out of step with respect to one another so as to stagger the punching positions in different rows. Thus at the right hand side of Figures 1 and 15, the center of the cap in any row is approximately opposite a point equidistant between the centers of the caps in the adjoining row.

In each of the forms of the invention, two dies are operated simultaneously in each row of caps. The stamping operation in all tracks or both tracks is also desirably simultaneous so that at any stop position of the caps all eight dies or all four dies cut out the corresponding number of spots and affix them to two caps in each row.

In the form of Figures 1 to 14 inclusive, as best seen in Figure 7, there are eight lines of cut-out positions 375 to 382 inclusive, due to the actions of punches 87 to 94 inclusive. The distance from the center of each line of cut-out positions to the center of the next adjoining line of cut-out positions approximately equals the diameter of the spot. Actually the distance between the centers of adjoining lines of cut-out positions is equal to the spot diameter minus the distance of inter-nesting at one side of a given line of cut-outs. The space between the centers of the respective rows of caps is an integer-plus-one-half times the sum of the diameter of the spot and the desired spacing between the cut-outs in a single row. Thus in Figures 1 to 14 the spacing between the centers of the rows of caps is three and one-half times the sum of the spot diameter plus the desired spacing between cut-outs in the same line.

It will be evident that in the various forms of the invention, the track center spacing between adjoining tracks is great enough so that each punch operating in the track first encountered by the protective spot material will produce a plurality of cut-outs in a given line before the first internesting cut-out produced by another punch in the next track on the next line will be encountered.

In the form of Figures 1 to 14 inclusive it will be noted that while the protective spot material undergoes one stop and go cycle, the crowns undergo two stop and go cycles. In its one cycle the protective spot material moves forward one spot diameter plus the distance between successive cut-outs in the same line (otherwise known as the spacing distance). In one cycle the crowns move twice the difference obtained by subtracting the distance of internesting at one side of a line of cut-outs from the spot diameter, and in two cycles the crowns move four times this difference. As the spacing distance and the distance of internesting are both normally small with respect to the spot diameter, it will be evident that while the protective spot material moves about one spot diameter the crowns move about four spot diameters. The speed of the protective spot material is thus about one-fourth the speed of the crowns. The reason that the protective spot material travels one-fourth the speed of the caps is that two simultaneous punches are made above each row of caps, and these two spotted caps whose centers are about two spot diameters apart must be cleared from beneath the protective spot material while the protective spot material moves the desired distance between adjoining punchings.

Stated generally, the speed of the protective spot material is a fraction of the speed of the crowns approximately equal to the reciprocal of the multiple equal to the number of spots simultaneously affixed in any row times the number of spot diameters separating crown centers in any row. More accurately stated, this fraction equals one spot diameter plus the spacing distance all divided by the product of the number of simultaneous punches per row times the approximate number of spot distances between crown centers times the difference between the spot diameter and the distance of internesting.

Where reference is made herein to speed or speed relationships between the caps moving in the tracks and the spot material moving transversely thereto, it is intended to indicate linear speed and not cyclic speed or relationship between the numbers of cycles. It will be evident, however, that the number of cycles of progression of the protective spot material in any given time is a fraction of the number of cycles of progression of the caps equal to the reciprocal of the number of caps receiving spots simultaneously in a given row. Depending upon the number of simultaneous cut outs in a given row, the number of cycles of the protective spot material may, for example, be one-half, one-third, one-fourth, etc., of the number of cycles of the caps.

Every time the protective spot material is started and stopped, going through its cycle of progression, there is a certain strain or jolt, and it is very desirable that such strains or jolts should be as infrequent as possible. Also in every cycle of progression of the protective spot material, there is a certain opportunity for error in feed and the error is therefore reduced by decreasing the number of cycles of the protective spot material per cycle of the caps. It should also be noted that since the cutouts internest, any error in feed of the protective spot material is likely to cause interference between cutouts of different lines and any such error is of course likely to be cumulative in the operation of the machine.

In the form of Figures 1 to 14 the punches operate every time the caps advance two cap distances. The cap centers being spaced approximately twice the spot diameter, the punches operate every time the caps advance approximately four times the spot diameter.

It will be noted that the cut-outs in line 375 slightly internest with the cut-outs in line 376, so that if a line of tangents were drawn to the cut-outs on line 375 on the side adjoining line 376, the cut-outs of line 376 would slightly cross this line of tangents. This distance that the cut-outs of line 376 extend beyond the line of tangents to the cut-outs of line 375 may be called the distance of internesting.

It is not necessary that as many as four rows of caps be used. In the form of Figures 15 to 23 inclusive, the principles of the invention are applied to a machine having two rows of caps. In this form (Figure 22) the lines of cut-outs 383 to 386 inclusive for punches 295, 295′, 296, 296′ correspond to lines 375 to 378 in their relation to punches 87 to 90 inclusive on Figure 7. The chief difference between the form of Figures 1 to 14 inclusive and the form of Figures 15 to 23 inclusive is that there is a different spacing between the rows of caps in Figures 15 to 23 inclusive. In both cases the rule is followed that the spacing between the rows of caps will be an integer-plus-one-half times the spot diameter plus the desired spacing between spots in a given row, but in the form of Figures 1 to 14 inclusive the multiple is three and one-half, while in the form of Figure 15 to 23 inclusive it is two and one-half.

It will be evident that various arrangements of punches, various distances between rows of caps, various spacing of caps in a given row and various relations of cap speed to speed of spot material may be employed as indicated in my copending application Serial No. 388,828, filed April 16, 1941, now abandoned, for purposes of affixing protective spot material. The disclosure of this copending application is incorporated herein by reference.

In both forms of the invention illustrated, the spacing between crowns in a given row is twice the spot diameter minus twice the distance of internesting at one side of a given line of cut-outs. If I were to generalize, I would say that the spacing of the crown centers is a multiple of the expression (spot diameter minus distance of internesting at one side of a given line of cut-outs).

It will be understood, of course, that in cutting a multiplicity of spots and affixing them simultaneously to a given row, the number of spots cut simultaneously need not be two and may for example be a greater number. In this case the relation of the speed of the protective spot material to the speed of the crown will be changed.

In any case the speed of the protective spot material will be a fraction of the speed of the caps approximately equal to the reciprocal of the multiple of the number of punches made simultaneously in a given row times the number of spot diameters between crown centers in a given row.

The preferred embodiment of the invention is that of Figures 1 to 14, although it will be evident that where smaller production is required or greater simplicity is desirable, the machine of Figures 15 to 23 may be recommended from that standpoint.

Where reference is made herein to a crown, it is intended to designate any similar character of cap to which a spot or the like is to be applied.

It will be evident that the invention not only greatly increases the economy of producing and affixing protective spots to caps, especially crowns, but also enables the user to increase the cap production from a given machine, to reduce the speed of the protective spot material, thus reducing the danger through stoppage because of tearing of the protective spot material, and to reduce the size of each machine, the number of machines and the financial investment in machines.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my invention.

Having thus described my invention what I claim as new and desire to secure by Letters Patent is:

1. In a machine for affixing protective spot material to caps, a plurality of tracks side by side, means for progressing rows of caps uniformly spaced along the tracks with stop and go motion and with the caps or one row in echelon with respect to those of another row in which the centers of the caps of one row are equally distant from the centers of the most closely adjacent caps of the next row, means for progressing a strip of protective spot material transversely over the rows with stop and go motion having corresponding stop periods, and means located at stop points for simultaneously cutting out and affixing protective spots to at least one cap in each of at least three rows.

2. In a machine for applying protective spot material to caps, a plurality of tracks side by side, means for progressing rows of caps uniformly spaced within their rows and differently but uniformly spaced in each row with respect to the most nearly adjacent caps in the next row along the tracks with stop and go motion, means for progressing a strip of protective spot material transversely over the tracks with stop and go motion having corresponding stop periods, the spacing of the caps in the rows and of the rows with respect to one another and the relation of the speed of the caps to the speed of the spot material all being related so as to produce a staggered internested relationship of the lines of protective spot cut-outs, and means for simultaneously cutting out and affixing protective spots to the caps in the rows having such staggered and internested relationship of the cut-outs, the spacing of the rows being such that a plurality of cut-outs can occur in one line before the first internesting cut-out is encountered in the next line.

3. In a machine for applying protective spot material to caps, a plurality of parallel tracks, means for progressing uniformly spaced caps bottom up in the tracks with stop and go motion, with staggered relationship between the caps in adjoining tracks and with a spacing of cap centers in a given track approximately equal to a multiple of the spot diameter, means for progressing a strip of protective spot material transversely over the tracks with stop and go motion having corresponding stop periods and a plurality of punch means positioned at stop points in each track for cutting out and affixing protective spots simultaneously to a plurality of caps in each track, each punch means being positioned laterally of the strip differently from each other punch means.

4. In a machine for applying cut-out protective spot material to caps, a plurality of parallel tracks, the track centers being spaced an integer-plus-one-half times the sum of the spot diameter and the distance between successive cut-outs in a given line, means for progressing uniformly spaced caps bottom up along the tracks with stop and go motion, the cap centers being spaced approximately a multiple of the spot diameter and the caps in adjoining tracks being out of phase with respect to one another, means for progressing a strip of protective spot material transversely over the rows with stop and go motion having corresponding stop periods, a plurality of punch means located at imperforate points on the protective spot material which are also stop positions for the caps in each track and means for operating all of the punches simultaneously during a stop period, the centers of adjoining lines of cut-outs being laterally displaced by a distance equal to the cut-out diameter minus the distance of internesting at one side of a line of cut-outs.

5. In a machine for applying cut-out protective spot material to caps, a plurality of parallel tracks, the distance between track centers being an integer-plus-one-half times the sum of the spot diameter and the distance between successive cut-outs in a given line, means for progressing uniformly spaced caps bottom up along the tracks with stop and go motion, with a staggered relation between the caps of adjoining rows and with a spacing between caps in a particular row approximately equal to a multiple of the spot diameter minus the distance of internesting of a line of cut-outs at one side, means for progressing a strip of protective spot material transversely over the tracks with stop and go motion having corresponding stop periods and means for simultaneously cutting out and affixing protective spots to a plurality of adjoining caps in each row during stop periods.

6. In a machine for applying cut-out protective spot material to caps, a plurality of parallel tracks, means for progressing uniformly spaced caps bottom up along the tracks with stop and go motion, the cap centers being spaced approximately a multiple of the spot diameter and the caps being staggered in one track with respect to another, means for progressing a strip of protective spot material transversely over the tracks with stop and go motion having corresponding stop periods, at a speed which is a fraction of the speed of the caps approximately equal to the reciprocal of the multiple of the number of simultaneous cut-outs in each track times the number of spot diameters between cap centers in each track, and means located at imperforate points on the protective spot material for simultaneously cutting out and affixing protective spot material to a plurality of caps in each track, the adjoining lines of cut-out centers being laterally displaced by a distance approximately equal to the spot diameter.

7. In a machine for applying cut-out protective spot material to caps, a plurality of parallel tracks whose distance between centers is an integer-plus-one-half times the sum of the spot diameter and the distance between successive cut-outs in a given line, means for progressing uniformly spaced caps bottom up along the tracks with stop and go motion, the cap centers in each track being spaced approximately a multiple of the difference obtained by subtracting the distance of internesting at one side of a line of cut-outs from the spot diameter and the caps in one track being in echelon with respect to those in another track, means for progressing a strip of protective spot material transversely over the tracks with stop and go motion having corresponding stop periods and at a speed which is a fraction of the speed of progression of the caps approximately equal to the reciprocal of the multiple of the number of simultaneous cut-outs in a single track times the number of spot diameters between cap centers in each track, a plurality of punch means at imperforate positions on the protective spot material which are also stop positions for the caps in each track, each punch being at a different position laterally of the protective spot material from each other punch, and means for operating all of the punches simultaneously during a stop period of the caps and the protective spot material.

8. In a machine for applying cut-out protective spot material to caps, two parallel tracks whose distance between centers is an integer-plus-one-half times the sum of the spot diameter and the distance between successive cut-outs in a given line, means for progressing uniformly spaced caps bottom up along the tracks with stop and go motion, the spacing of the cap centers in each track being approximately a multiple of the spot diameter and the crowns in one track being staggered with respect to those in the other track, means for progressing a strip of protective spot material transversely over the track with stop and go motion having corresponding stop periods, a plurality of punch means at imperforate points on the protective spot material which are also stop points in each track, each punch being at a position laterally of the protective spot material different from each other punch, and means for operating all of the punches simultaneously during stop periods.

9. In a machine for applying cut-out protective spot material to caps, two parallel tracks whose centers are spaced an integer-plus-one-half times the sum of the spot diameter and the distance between successive cut-outs in a given line, means for progressing caps along the tracks bottom up with stop and go motion, with staggered relationship between caps in the different tracks and with cap centers spaced approximately twice the spot diameter, means for progressing a strip of protective spot material transversely over the tracks with stop and go motion having corresponding stop periods and at a speed of one-fourth that of the caps, a pair of punch means at imperforate points on the protective spot material which are also stop points in each track, and each spaced laterally of the protective spot material differently from each other punch in either track, and means for simultaneously operating all punches at stop periods.

10. In a machine for applying cut-out protective spot material to caps, four parallel tracks, the distance between centers of adjoining tracks being an integer-plus-one-half times the sum of the spot diameter and the distance between successive cut-outs in a given line, means for progressing uniformly spaced caps bottom up along the tracks with stop and go motion, the cap centers in each track being spaced approximately twice the spot diameter, and the caps in one track staggered with respect to those in another track, means for progressing protective spot material transversely over the rows with stop and go motion having corresponding stop periods, punch means disposed at imperforate points on the protective spot material which are also stop points on the different tracks, each punch being disposed laterally of the protective spot material differently from each other punch and means for simultaneously operating the punches to cut-out and adhesively affix circular protective spots to at least one cap in each row.

11. In a machine for applying cut-out protective spot material to caps, four parallel tracks, the distance between centers of adjoining tracks being an integer-plus-one-half times the sum of the spot diameter and the distance between successive cut-outs in a given line, means for progressing uniformly spaced caps bottom up along the tracks with stop and go motion, the cap centers in each track being spaced approximately twice the spot diameter, and the caps in one track staggered with respect to those in another track, means for progressing protective spot material transversely over the tracks with stop and go motion having corresponding stop periods, punch means disposed at imperforate points on the protective spot material which are also stop points on the different tracks, each punch being disposed laterally of the protective spot material differently from each other punch, and means for simultaneously operating all of the punches to cut out and adhesively affix circular protective spots to a plurality of caps in each of the four tracks.

12. In a machine for applying protective spot material to caps, means for progressing a plurality of parallel rows of horizontal caps bottom up with stop and go motion in uniformly spaced relation with caps staggered in one row with respect to another row, vertical guides extending on either side of the rows, a punch plate adapted to reciprocate in the guides, means for reciprocating the punch plate, means for feeding protective spot material across the rows beneath the punch plate in stop and go motion having corresponding stop periods, a plurality of staggered punches secured to and moving with the punch plate above the protective spot material and at stop positions of the caps, female dies beneath the protective spot material and above the caps, cooperating with the punches and means for adjusting the vertical positions of the individual punches with respect to the punch plate.

13. In a machine for affixing protective spot material to caps, a plurality of horizontal tracks side by side, means for progressing rows of equally spaced caps bottom up with stop and go motion along the tracks in staggered relation to one another, vertical guides on either side of the tracks, a punch plate adapted to move up and down in the vertical guides, means for reciprocating the punch plate, a cap locator plate having cap locating extensions corresponding to stop positions of the caps extending horizontally over the tracks beneath the punch plate, resilient means connecting the cap locator plate and the punch plate, female dies above the cap locator plate and having positions corresponding to its locating extensions, means for progressing protective spot material transversely over the track and above the female dies, and a plurality of punches secured to the punch plate and normally above the protective spot material, staggered in respect to one another and corresponding in position to the cap locating extensions.

14. In mechanism for affixing protective spot material to caps, a plurality of cap chutes, a plurality of tracks receiving caps from the chutes, the chutes being relatively in advance in one track in respect to another track so that the caps as delivered to the tracks are staggered, and staggered pusher means initially advancing the caps in staggered relation in the tracks.

15. In mechanism for affixing protective spots to caps, a pair of parallel tracks, a pair of cap chutes each connected to one of the tracks and one relatively advanced with respect to another so that the caps as initially delivered to the tracks are staggered, staggered pushers in the respective tracks, means for resiliently urging the pushers forward and reciprocating cross bar means rearwardly moving the pushers and permitting forward movement thereof.

16. In mechanism for handling caps, a plurality of parallel tracks, finger bars adapted to progress the caps in the tracks, eccentric means for operating the finger bars, a cam having dwells positioned beneath each track and means for moving the dwells into position between the caps when the corresponding finger bar is in inoperative position.

17. In mechanism for progressing caps, a cap track, a finger bar adapted to progress caps in the track, eccentric drive means for the finger bar, a cam having dwells extending beneath the track and means for turning the cam into operative position of the dwells when the finger bar is in inoperative position.

18. In a machine for affixing protective spots to caps, a plurality of parallel tracks, a finger bar extending longitudinally of each track, eccentric means for manipulating the finger bar to advance caps step by step in the tracks, a cam extending longitudinally beneath each track having locator portions at each step, means for driving the cams to place the locator portions in contact with the caps when the finger bars are in inoperative position, and punch means for cutting out and affixing spots to the caps at times when the locator portions are in engagement with the caps.

19. In a machine for affixing protective spots to caps, four parallel tracks, the centers of adjoining tracks being spaced approximately an integer-plus-one-half times the spot diameter, rotary cams beneath the tracks having advance portions on one part of their circumferences and dwell portions on another part of their circumferences, the dwell portions on the cams in the first and third tracks being in line and being staggered in respect to the dwell portions on the cams in the second and fourth tracks, which latter are in line with one another, means for progressing protective spot material step by step transversely above the tracks with stop periods at certain times when the dwell portions of the cams are in engagement with the caps, means for driving the cams in unison, punches above the protective spot material at stop positions of the caps, each punch being disposed laterally of the protective spot material at a different position from each other punch and means for operating all the punches simultaneously.

20. In mechanism for progressing caps, a plurality of parallel tracks, means for progressing uniformly spaced caps along the tracks with stop and go motion and staggered relationship between caps of different tracks, and means for abnormally advancing caps in an individual track to bring them into phase with caps in another track.

21. In mechanism for progressing caps, a pair of tracks adapted to receive caps bottom up, means for progressing the caps along the tracks by stop and go motion with the caps in one track staggered with respect to those in the other track, a rotary cam beneath each track having at one angular position dwells between various cap stop positions, the dwells in the respective tracks being staggered, and an advance face on one of the cams at the same angular position as the dwells for advancing caps abnormally at one position and bringing the caps in that track into phase with those in the other track.

22. In mechanism for advancing caps step by step, a pair of parallel tracks adapted to hold caps advancing bottom up in staggered relation, a rotary cam beneath each track having at each of the cap positions an advancing face over one portion of its circumference and a dwell over another portion of its circumference, the advance faces and the dwells on the respective cams being normally out of phase, and an abnormal advance face on the dwell portion of the circumference of one of the cams at one cap position for bringing the crowns into phase.

23. In mechanism for progressing caps, a plurality of cap tracks, and a cam beneath each track, each cam having an advance portion and a dwell portion, and the advance portions of the respective cams being out of phase during the earlier cap positions along the cams and in phase during the later positions.

24. In mechanism for progressing caps, a pair of parallel tracks, a finger bar cooperating with each track and out of step in one track with respect to another track during the early portion of the cap travel, cam means for abnormally advancing the caps in one track into step with the caps in the other track, a finger bar finger adjoining such cam means having a rear face engaging the forward portion of cap prior to advance by the cam means and a forward face engaging the rearward portion of the cap after advance by the cam means and eccentric means for operating the finger bars.

25. In mechanism for progressing caps, a plurality of parallel tracks, a finger bar cooperating with each track and out of step in one track with respect to another track during the early portion of the cap travel, cam means for abnormally advancing the caps in one track into step with the caps in another track, a finger bar finger adjoining such cam means having a rear face engaging the forward portion of a cap prior to advance by the cam means and a forward face engaging the rearward portion of the cap after advance by the cam means, fingers on the finger bars beyond the cam means which are respectively in step and eccentric means for operating the finger bars.

26. In a machine for applying cut-out protective spots to caps, a pair of parallel tracks, a finger bar longitudinal of each track, one finger bar in one track having uniform and uniformly spaced fingers and the other finger bar in the other track having in its early portions uniformly spaced fingers which are staggered with respect to the fingers of the other finger bar and at its later portions fingers which are in phase with the fingers of the other finger bar, and eccentric means for driving the finger bars.

27. In a machine for affixing protective spots to caps, a plurality of parallel tracks, a plurality of finger bars, one for each track, extending longitudinally thereof, eccentric means for manipulating the finger bars to advance caps step by step along the tracks, a transverse finger bar across the tracks at the end thereof, and eccentric means for driving the transverse finger bar to progress the caps beyond the ends of the tracks.

28. In a machine for affixing protective spots to caps, a pair of parallel cap tracks, means for advancing caps in uniformly spaced staggered relation along the tracks by stop and go motion, means for cutting out and affixing protective spots to the caps while retaining the staggered relation, means for abnormally advancing the caps in one track into phase with those in another track, to bring them into line transversely of the lengths of the tracks and a pressure dial interconnected with both tracks where the caps are in phase and adapted to apply pressure to the spots in the caps.

29. In a machine for affixing protective spots to caps, a plurality of parallel cap tracks, cam means for each track having cam faces for advancing the caps in that track, a pressure dial in communication with the tracks, a finger bar engaging the caps at the ends of the track and feeding them into the pressure dial and eccentric means for driving the finger bar.

30. In a machine for affixing protective spot material to caps, a plurality of parallel tracks, means for progressing caps step by step in spaced relation along the tracks, means for cutting out and applying protective spot material to the caps, a pressure dial at the ends of the tracks, adapted to receive spotted crowns from the tracks and apply pressure to them, a transverse finger bar at the ends of the tracks and means for driving the finger bar in an eccentric path to feed caps from the tracks into the pressure dial.

31. In mechanism for affixing protective spots to caps, a pressure dial of cylindrical form having a plurality of circumferentially disposed stations and a plurality of laterally disposed positions at each station, pressure means for engaging caps in each of the positions at each of the stations and cam means for releasing the pressure at a particular point on the circumference.

32. In mechanism for applying pressure to caps, a rotor, a plurality of anvils circumferentially disposed along the rotor, a plurality of pressure heads longitudinally disposed along each anvil, means for locating caps beneath the pressure heads and means for applying pressure to the pressure heads.

33. In mechanism for applying pressure to caps, a rotor, a plurality of anvils circumferentially disposed along the rotor, a plurality of pressure heads longitudinally disposed along each anvil, means for locating caps beneath the pressure heads, resilient means for applying pressure to the pressure heads, and cam means for releasing the resilient pressure.

34. In mechanism for applying pressure to caps, a rotor, a plurality of anvils circumferentially disposed along the rotor, a plurality of pressure heads longitudinally disposed along each anvil, means for locating caps beneath the pressure heads, resilient means for applying pressure to the pressure heads, rocker cam means extending longitudinally of the rotor adjoining each anvil for releasing the pressure from the resilient means and stationary cam means at a particular point along the rotor travel for operating the rocker cam means.

35. In a pressure dial, a rotor, a plurality of circumferentially placed anvils on the rotor, means for positioning caps on the anvils, a plurality of pressure heads each cooperating with one of a plurality of cap positions on each anvil, a lever supporting each pressure head and a spring pressing each lever towards closure of its pressure head against the corresponding anvil.

36. In a pressure dial, a rotor, a plurality of circumferentially placed anvils, means for positioning caps on the anvils, a plurality of pressure heads each cooperating with one of a plurality of cap positions on each anvil, lever means supporting each pressure head, a spring pressing each lever means towards closure of its pressure head against the corresponding anvil, a cam shaft running across the rotor at each anvil having a cam cooperating with each lever means and rockable to release pressure from the pressure heads, a cam roller on each cam shaft, and a stationary cam at one position along the travel of the rotor there engaging the roller and rocking the cam shaft to release the pressure heads.

37. A pressure dial having a rotor, means for turning the rotor about a vertical axis, radially inner and radially outer anvil positions around the pressure dial rotor, pressure plunger means cooperating with each anvil and automatic means for loading caps into the radially inner and radially outer anvil positions.

38. A pressure dial having a rotor, means for turning the rotor about a vertical axis, radially inner and radially outer anvil positions around the pressure dial rotor, a pressure plunger cooperating with each anvil, means for applying pressure to the pressure plungers, and cam means for holding the pressure plungers in open position during a portion of the travel of the rotor.

39. A pressure dial having a rotor, means for turning the rotor about a vertical axis, radially inner and radially outer anvil positions around the pressure dial rotor, a pressure plunger cooperating with each anvil, spring means for applying resilient pressure to each pressure plunger, a movable cam on the end of each pressure plunger and fixed cams engaging the movable cams and raising the pressure plungers to open position.

40. In a machine for affixing protective spots to caps, an anvil having a plurality of cap receiving positions in line, locator walls defining the cap receiving positions, a lever for each cap receiving position, means for pivoting the levers on the anvil rigidly and in a straight line, with the pivots between the extremities of the lever, one end of each lever being in cooperation with the anvil at the locator walls, pressure heads one mounted on said end of each lever, spring means resiliently urging each lever toward closure of its pressure head and located at the opposite end beyond the pivot from the pressure head, and a rocker cam shaft extending across all said levers having cams for depressing said opposite ends of the levers and holding the pressure heads open.

41. In mechanism for affixing protective spots to caps, a plurality of cap tracks, a pressure dial having a rotor on a vertical axis adapted to receive caps from the tracks and having radially inner and radially outer positions, finger bars one for each track adapted to advance caps in the track by stop and go motion, one of which finger bars has an endmost finger which feeds caps from one such track into radially outer positions of the pressure dial, and another of which finger bars has an endmost finger which brings caps from another track first into phase with those of the first track and subsequently into radially inner positions on the pressure dial, and an abutment cooperating with the latter finger to bring the caps into the radially inner positions.

42. In mechanism for affixing protective spot material to caps, a rotor hub on a vertical axis, an outer rotor circumference having anvil portions, means for circumferentially adjusting the positions of the anvil portions with respect to the rotor hub, and means for applying pressure to caps positioned at intervals around the anvil portions.

43. In a machine for affixing protective spot material to caps, a rotor, means for supporting the rotor on a vertical axis, a circumferential anvil horizontally positioned on the rotor, inner and outer locator walls for caps on the anvil, plunger means corresponding to the positions of the locator walls for applying pressure to caps which have been located on the anvil and means for feeding caps radially into contact with the locator walls.

44. In a machine for affixing spots of protective spotting material in caps, parallel tracks containing spotted caps in staggered positions in one track as compared with the next, a continuous rotary dial presenting receiving dial positions transversely of the said tracks, an aligning device for bringing the caps into line transversely of the tracks and in proximity to the receiving positions, means for feeding the caps concurrently from their aligned positions into the receiving positions of the pressure dial, anvil means for supporting caps while they are in the pressure dial positions, plungers, carried by the dial, one for each cap, and operating means for bringing plunger pressure on the spots against the lining of the caps, means for rotating the pressure dial and discharge means for the caps, freeing them from the pressure dial.

45. In a machine for affixing spots of protective spotting material in caps, a group of parallel tracks along which caps are adapted to be progressed, and upon which a plurality of spotted caps are located, out of line transversely of the track lengths, means for aligning the caps transversely in the group of tracks, a rotary, continuously movable pressure dial having sockets corresponding in number with the group of tracks, adapted to be placed opposite the outlets of the tracks of the group, means for feeding the end caps within the tracks of the group into the pressure dial sockets and a group of plungers carried by the dial, corresponding in number and position with the spotted caps in the sockets, means for operating the plungers concurrently, anvil means for receiving the thrust of the plungers through the caps, means for rotating the pressure dial and means for discharging the caps from the dial.

46. In a machine for affixing spots of protective spotting materials to caps, means for feeding caps in two or more rows, in staggered relation, the caps in one row with respect to the caps in the row next to it, means for affixing spots in the caps in the respective rows while the caps are maintained in staggered relation, aligning means for altering the positions of the staggered spotted caps so that they are in line transversely of the rows, a rotary pressure dial presenting receiving positions for the spotted caps transversely to the aligned rows of the spotted caps, means for feeding the caps, one for each receiving position, concurrently into the receiving positions, means for continuously moving the dial, anvil means beneath the caps in their receiving positions, plungers carried by the dial to hold the spots against the cap linings during a portion of the movement of the pressure dial and discharge means for the caps removing them from the receiving positions of the pressure dials.

ANDREW WEISENBURG.

REFERENCES CITED

The following references are of record in the file of this patent:

UNITED STATES PATENTS

| Number | Name | Date |
| --- | --- | --- |
| 1,118,778 | Johnson | Nov. 24, 1914 |
| 1,134,031 | Clark | Mar. 30, 1915 |
| 1,155,171 | Sturtevant | Sept. 28, 1915 |
| 1,369,921 | Erhard | Mar. 1, 1921 |
| 1,381,053 | Binder | June 7, 1921 |
| 1,387,037 | Binder | Aug. 9, 1921 |
| 1,462,094 | Walsh | July 17, 1923 |
| 1,469,557 | Goebel | Oct. 2, 1923 |
| 1,661,912 | Skov | Mar. 6, 1928 |
| 1,725,300 | Pierson | Aug. 20, 1929 |
| 1,768,605 | Johnson | July 1, 1930 |
| 1,809,341 | Jensen | June 9, 1931 |
| 1,852,578 | Johnson | Apr. 5, 1932 |
| 2,017,124 | Johnson | Oct. 15, 1935 |
| 2,117,711 | Eisen | May 17, 1938 |
| 2,342,504 | Weisenburg | Feb. 22, 1944 |

FOREIGN PATENTS

| Number | Country | Date |
| --- | --- | --- |
| 25,574 | Great Britain | 1912 |
| 48,714 | Denmark | May 7, 1934 |